United States Patent
Kamada

(10) Patent No.: US 8,203,668 B2
(45) Date of Patent: *Jun. 19, 2012

(54) OPTICAL MEMBER UNIT, LIGHTING DEVICE FOR DISPLAY, DISPLAY, AND TELEVISION RECEIVER

(75) Inventor: Kentaro Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 384 days.

This patent is subject to a terminal disclaimer.

(21) Appl. No.: 12/594,333

(22) PCT Filed: Dec. 5, 2007

(86) PCT No.: PCT/JP2007/073455
§ 371 (c)(1),
(2), (4) Date: Oct. 1, 2009

(87) PCT Pub. No.: WO2008/120419
PCT Pub. Date: Oct. 9, 2008

(65) Prior Publication Data
US 2010/0110332 A1 May 6, 2010

(30) Foreign Application Priority Data

Apr. 2, 2007 (JP) ................................. 2007-096582

(51) Int. Cl.
- G02F 1/1335 (2006.01)
- G02B 27/12 (2006.01)
- F21V 5/04 (2006.01)
- H04N 5/225 (2006.01)

(52) U.S. Cl. .............. 349/65; 349/56; 349/57; 359/619; 362/619; 348/360

(58) Field of Classification Search ............ 358/208.11, 358/332, 336.08, 360, 761, 790, 791, 794, 358/825, 827, 832, 836; 349/56, 57, 58, 349/95, 112, 85, 62, 200; 359/619, 741; 362/619, 97.1; 348/208.11, 332, 336.08, 348/360, 761, 790, 791, 794, 825, 827, 832, 348/836

See application file for complete search history.

(56) References Cited

U.S. PATENT DOCUMENTS

| 5,519,539 A | * | 5/1996 | Hoopman et al. | 359/741 |
|---|---|---|---|---|
| 6,031,591 A | * | 2/2000 | Hamanaka | 349/95 |
| 6,097,434 A | * | 8/2000 | DeLeeuw | 348/340 |
| 6,917,474 B2 | * | 7/2005 | Borrelli et al. | 359/619 |
| 6,950,234 B1 | | 9/2005 | Onishi | |
| 7,439,938 B2 | * | 10/2008 | Cho et al. | 345/1.3 |
| 2005/0036335 A1 | | 2/2005 | Ohtomo et al. | |

(Continued)

FOREIGN PATENT DOCUMENTS

| JP | 6-301033 A | 10/1994 |
|---|---|---|
| JP | 9-197106 A | 7/1997 |
| JP | 2005-221619 A | 8/2005 |

(Continued)

Primary Examiner — Brian Healy
(74) Attorney, Agent, or Firm — Birch, Stewart, Kolasch & Birch, LLP

(57) ABSTRACT

An optical member 15 is constituted by sticking a lens sheet 28 capable of transmitting light irradiated toward a liquid crystal panel 11 and a diffuser sheet 27 together. The lens sheet 28 is provided with a lens portion 30 having a large number of unit lenses 29 aligned on the front surface, while on the rear surface, provided with a reflecting layer 32 having an opening 31 corresponding to the lens portion 30. The optical member 15 is received on the backside by receiving members 21 and 24 provided respectively in a holder 17 and a lamp holder 16, while being held from the front by a frame 18. A protrusion 33 is provided in the receiving member 24 in the holder 17, which supports the optical member 15 in a posture so that the edge 15a of the optical member 15 and the arrangement of the unit lenses 29 are inclined relatively to the arrangement of the pixel electrodes PE in the liquid crystal panel 11, by abutting an outer circumferential end surface 15b in the optical member 15.

14 Claims, 21 Drawing Sheets

U.S. PATENT DOCUMENTS

| | | |
|---|---|---|
| 2007/0115401 A1 | 5/2007 | Tsubokura et al. |
| 2010/0110332 A1* | 5/2010 | Kamada .......................... 349/62 |
| 2010/0134721 A1* | 6/2010 | Kamada .......................... 349/65 |

FOREIGN PATENT DOCUMENTS

| | | |
|---|---|---|
| JP | 2006-17957 A | 1/2006 |
| JP | 2006-276588 A | 10/2006 |
| JP | 2006-309002 A | 11/2006 |
| JP | 2007-41172 A | 2/2007 |
| JP | 2007-42540 A | 2/2007 |
| WO | WO-2001/014913 A1 | 3/2001 |
| WO | WO-2006/123472 A1 | 11/2006 |

* cited by examiner

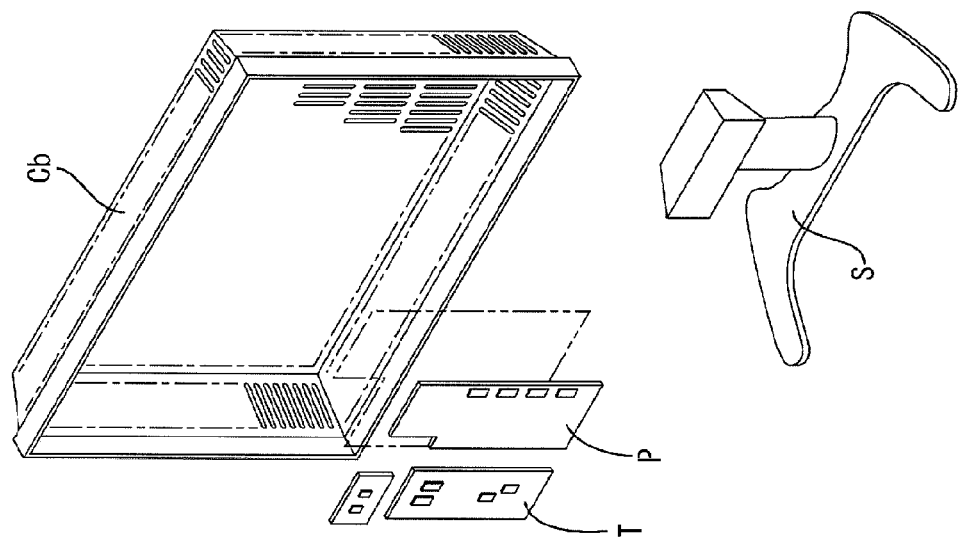
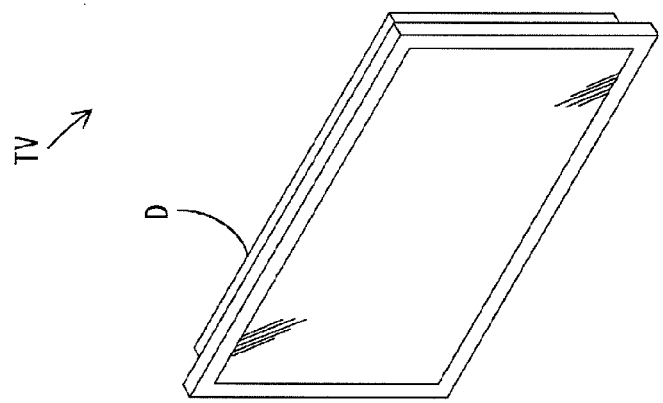
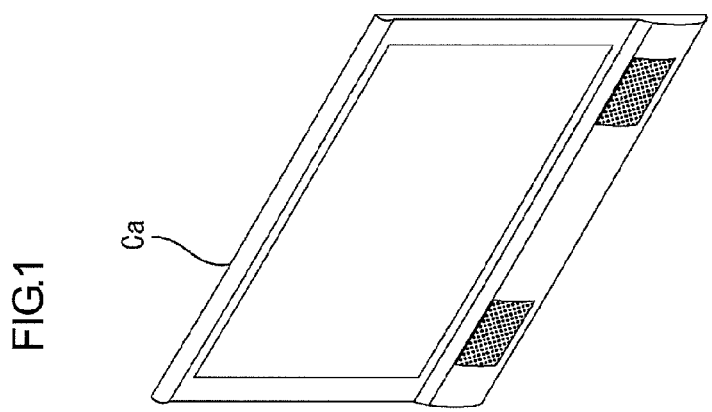
FIG.1

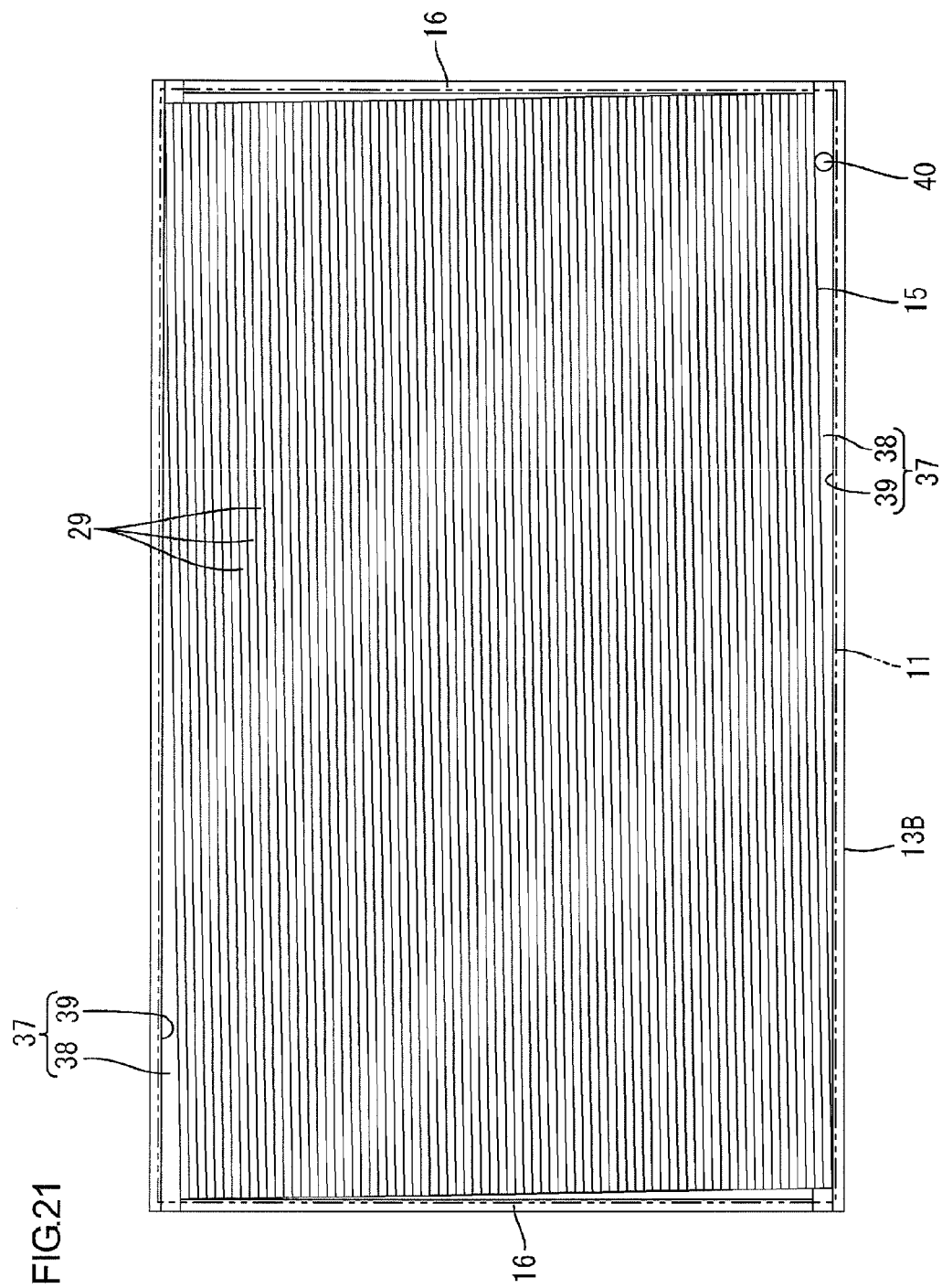

OPTICAL MEMBER UNIT, LIGHTING DEVICE FOR DISPLAY, DISPLAY, AND TELEVISION RECEIVER

FIELD OF THE INVENTION

The present invention relates to an optical member unit, a lighting device for display, a display, and a television receiver.

BACKGROUND ART

A liquid crystal display device is composed of a liquid crystal panel as a display panel and a backlight as an external light source placed in the rear surface side of the liquid crystal panel. Among these, the backlight comprises a plurality of cold cathode fluorescent lamps as a linear light source and an optical member for converting a linear light emitted from each cold cathode fluorescent lamp into a surface light. The optical member is constituted normally by laminating multiple of such as a diffuser plate, a diffuser sheet, a lens sheet, and a brightness enhancing sheet, however, with such configuration, the emitted light is diffused easily in a direction not used for display, resulting in undesirable light use efficiency.

Considering the foregoing, the invention disclosed in Patent Literature 1 has been known as an example of the optical member having improved light use efficiency. In the above invention, a lens portion having a plurality of unit lenses arrayed therein is provided on the front surface, whereas a reflecting layer having an opening is provided on the back surface. The reflecting layer is placed in the area corresponding to the part where lights of the unit lenses are not converged, whereas the opening is placed in the area corresponding to the light converging part of the unit lenses, and therefore, the light diffusing angle can be easily controlled by adjusting the size ratio between the reflecting layer and the opening. Consequently, the emitted light in the direction not used for display can be reduced, and thereby improving the light use efficiency.

[Patent Literature 1]: Japanese Unexamined Patent Publication No. 2005-221619

Problem to be Solved by the Invention

On the other hand, when using the optical member comprising a lens portion as an optical member for the backlight, the following problem may occur. In short, when interference occurred between the arrangement of pixels provided in a liquid crystal panel and the arrangement of the unit lenses composing the lens portion, display defect called moire may appear. As a method for avoiding moire, for example, the optical member in which the arrangement of the unit lenses is inclined relative to the edge of the optical member may be produced and used, so as to incline the arrangement of the unit lenses relative to the pixel arrangement.

However, the above-mentioned countermeasure needs to produce a particular kind of optical member with the arrangement of the unit lenses inclined relative to the edge, and may result in a cost increase. Particularly, like the above-mentioned Patent Literature 1, regarding the optical member comprising a lens portion on the front side while comprising the opening and the reflecting layer corresponding to the lens portion on the back side, it is extremely difficult to produce the one in which the arrangement of the unit lenses is inclined relative to the edge, and a more effective countermeasure against moire has therefore been required.

Disclosure of the Invention

The present invention has been completed based on the above circumstances, and its purpose is to provide an optical member unit in which moire can be avoided while using an optical member having unit lenses arranged in parallel with the edge.

Means for Solving the Problem

The present invention comprises: an optical member capable of transmitting light irradiated toward a display panel and comprising a lens portion where a plurality of unit lenses are arranged in parallel with the edge, a positioning member forming a nearly frame shape and capable of positioning the optical member in a prescribed posture relative to the display panel, and an inclined posture supporting member which intervenes between the optical member and the positioning member and supports the optical member in a posture so that the edge of the optical member and the arrangement of the unit lenses incline relatively to the arrangement of pixels formed on the display panel.

Thereby, the occurrence of moire caused by the interference between the arrangement of pixels in the display panel and the arrangement of the unit lenses can be prevented by the inclined posture supporting member, while using the optical member comprising the lens portion wherein the unit lenses are arranged in parallel with the edge. Accordingly, a measure can be taken against moire without using a particular optical member in which the unit lenses are arranged while being inclined relative to the edge.

BRIEF DESCRIPTION OF THE DRAWINGS

FIG. 1 is an exploded view showing an outline of a television receiver according to Embodiment 1 of the present invention;

FIG. 21 is a plan view showing a state where the optical member is put onto the chassis and the holder.

BEST MODE FOR CARRYING OUT THE INVENTION

<Embodiment 1>

Embodiment 1 of the present invention is explained in reference to FIGS. 1 to 12. In Embodiment 1, a liquid crystal display device D is exemplified as a display.

Figure 2:
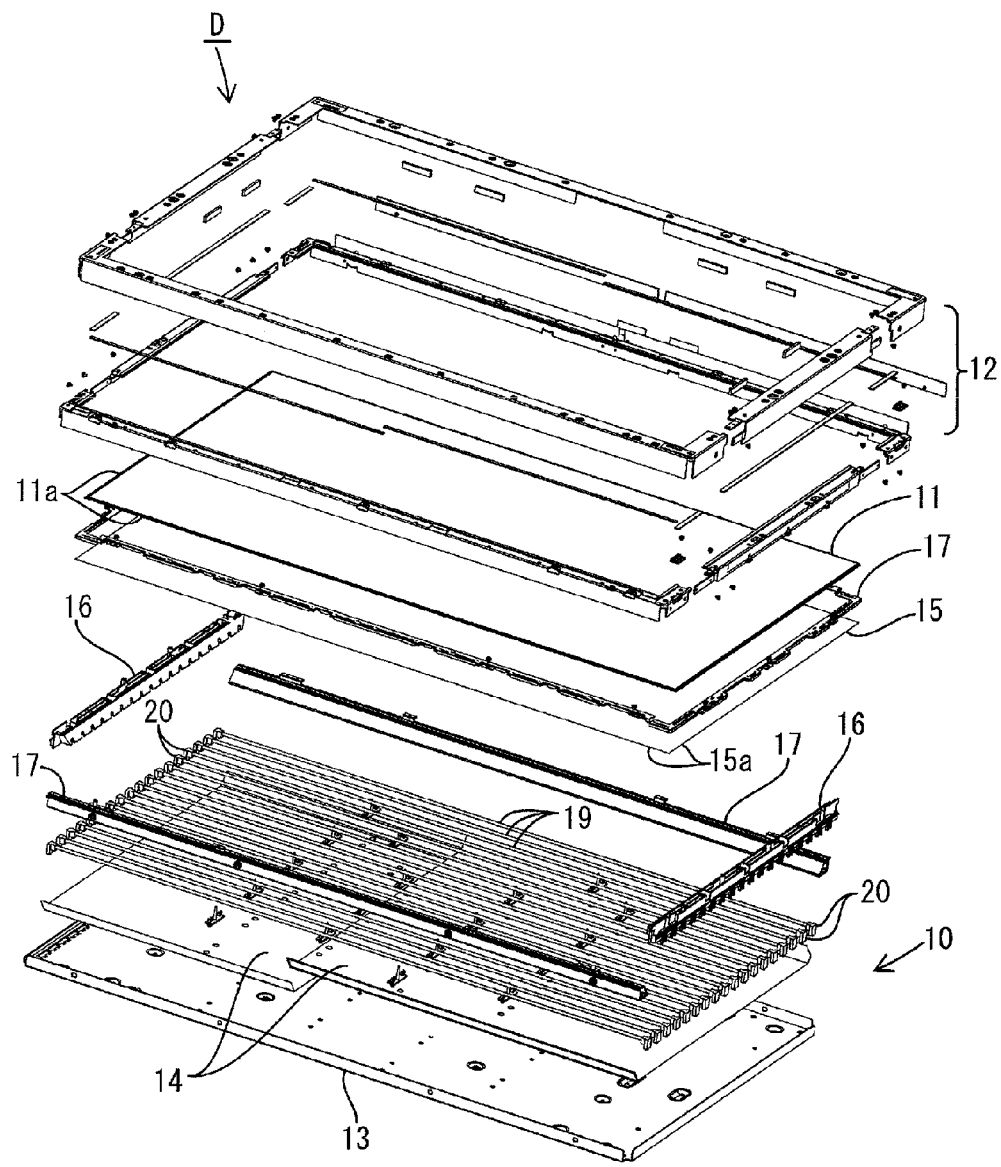
FIG. 2 is an exploded perspective view showing an outline of a liquid crystal display device.

The liquid crystal display device D has a laterally long square shape on the whole, and is constituted by, as shown in FIG. 2, holding a liquid crystal panel 11 as a display panel and a backlight 10 as an external light source (lighting device) of the liquid crystal panel 11 into a fitted-state by a bezel 12 covering from the front side. The liquid crystal panel 11 is disposed in the front side of the backlight 10, and irradiated by the backlight 10 from the rear surface side. The liquid crystal display device D can be applied to a television receiver TV. The television receiver TV is constituted by comprising, as shown in FIG. 1, the liquid crystal display device D, both front and rear cabinets Ca and Cb housing the liquid crystal display device D in a manner so as to hold it from both sides, a power source P, a tuner T, and a stand S.

Figure 3:
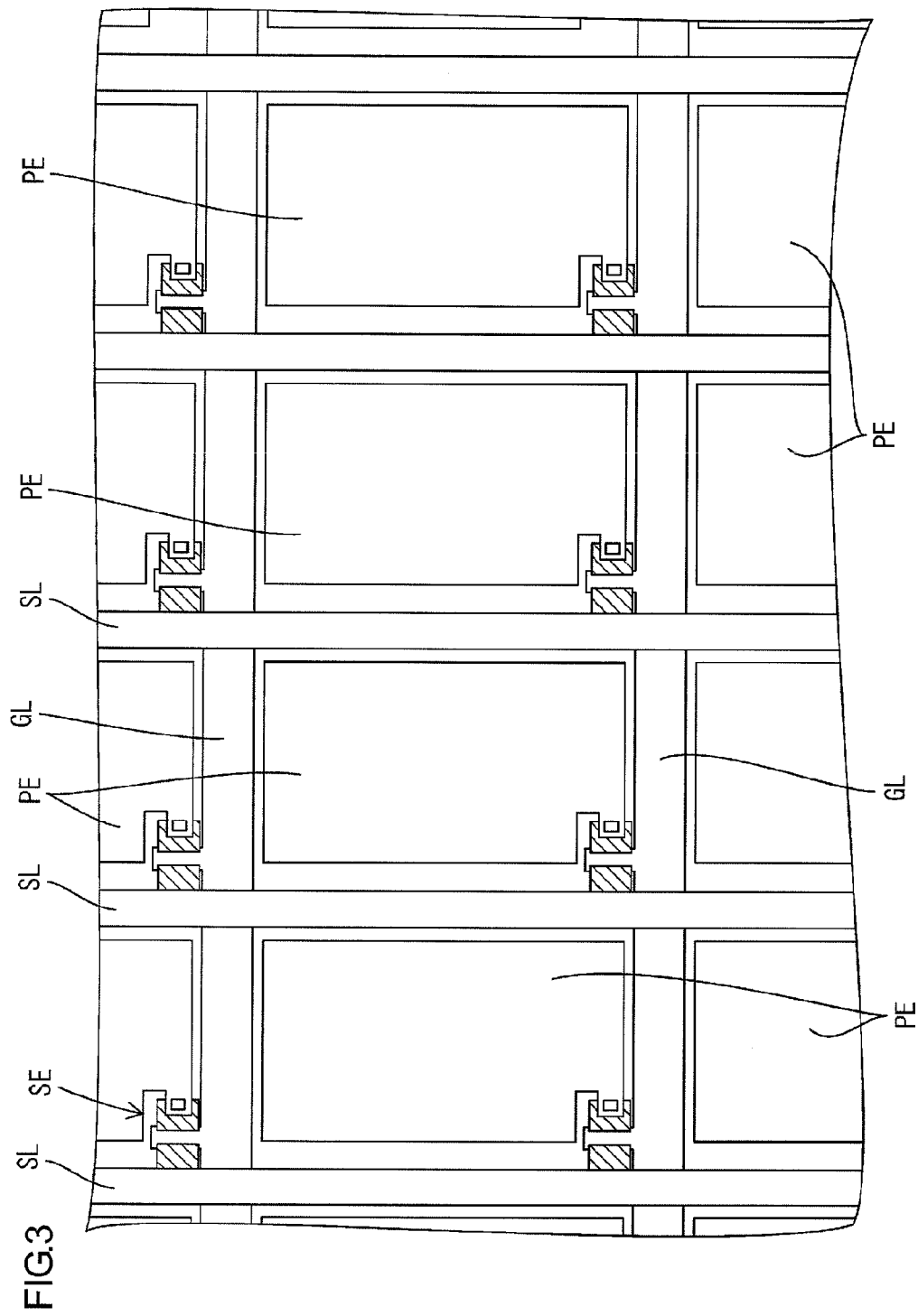
FIG. 3 is a plan view of a TFT substrate of a liquid crystal panel.
Figure 4:
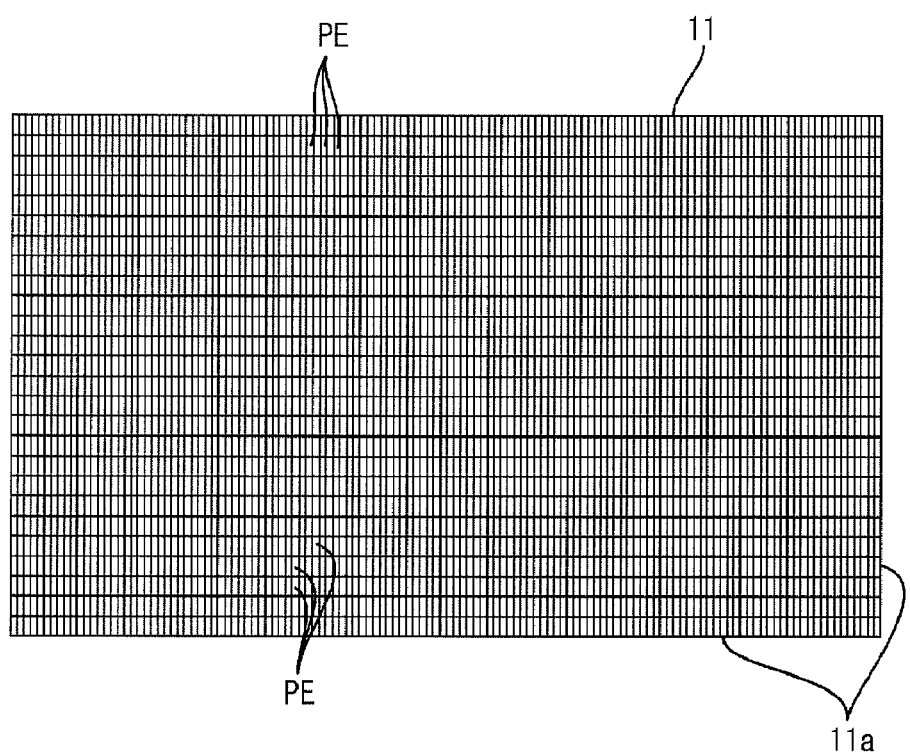
FIG. 4 is a plan view showing an outline of the arrangement of pixel electrodes in the liquid crystal panel.
Figure 6:
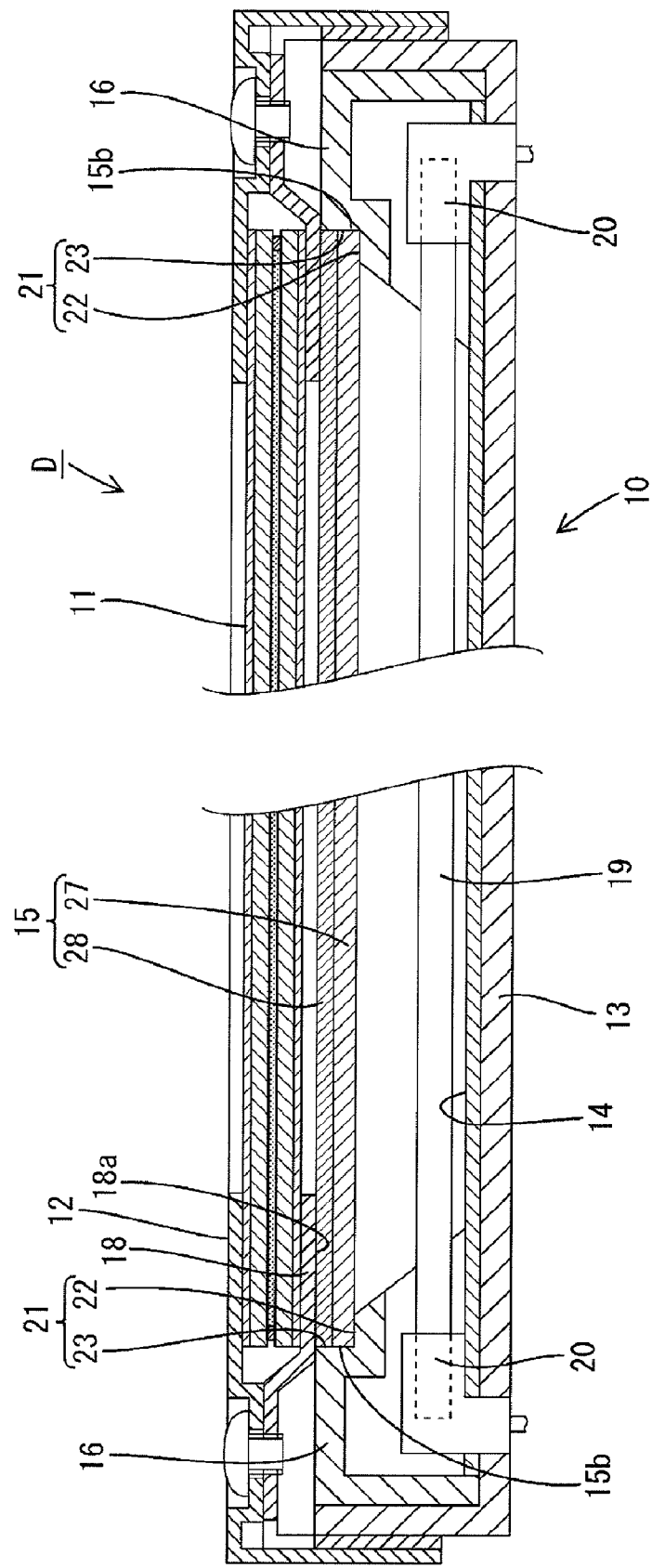
FIG. 6 is a cross sectional view of the liquid crystal display device taken along a line X-X shown in FIG. 5.

As shown in FIG. 6, the liquid crystal panel 11 has a known structure comprising a liquid crystal as a material having an optical property changable in accordance with voltage application sealed in between a transparent TFT substrate and a transparent CF substrate. As shown in FIG. 3, a large number of source wirings SL extending longitudinally and gate wirings GL extending laterally in the figure are arranged on the inner surface of the TFT substrate in the backside, forming a grid pattern. Both wirings SL and GL are connected to an external circuit (not shown) capable of supplying such as image signals. Each square area surrounded by both wirings SL and GL is provided with a large number of switching elements SE such as TFT and transparent pixel electrodes PE aligned therein. The arrangement of the pixel electrodes PE in the liquid crystal panel 11 (pixel arrangement) is, as shown in FIG. 4, in a manner so as to align in parallel with an edge 11a in the long side and the short side of the liquid crystal panel 11. Additionally, the pitch between each wiring SL and GL as well as the arrangement spacing of the pixel electrodes PE may be changed in accordance with the screen size and the number of pixels of the liquid crystal panel 11. For example, in the liquid crystal panel 11 outputting 1920×1080 pixels with the 45-inch screen size, the arrangement spacing of the pixel electrodes PE (pixel pitch) is specified around 513 μm in the long side, while around 171 μm in the short side (one third of the long side). On the other hand, a color filter having colored parts of the three primary colors: red (R), green (G), and blue (B) arranged in a matrix state is provided in the CF substrate. And also, a polarization plate is attached to the surface opposite to the liquid crystal side in both substrates.

The backlight 10 is so-called a direct type, comprising: a chassis 13 opening in the front surface (the upper front side in FIG. 2), a reflective sheet 14 laid inside of the chassis 13, an optical member 15 mounted in the opening part of the chassis 13, a positioning member capable of positioning the optical member 15 in a prescribed posture relative to the liquid crystal panel 11 (the later described lamp holder 16, holder 17, and frame 18), and a plurality of cold cathode fluorescent lamps 19 housed inside of the chassis 13.

The chassis 13 is made of a metal and formed in a nearly box shape, rectangular in plan view and opening in the front surface as shown in FIG. 6. The reflective sheet 14 is made of synthetic resin, with the front surface generally being white that is superior in reflexibility, and laid on, as covering, nearly the whole area of the inner surface of the chassis 13. This reflective sheet 14 can guide the light emitted from each cold cathode fluorescent lamp 19 toward the opening side of the chassis 13. The cold cathode fluorescent lamp 19 is a type of linear light sources, and mounted in the chassis 13 in a posture so that its axial direction is coincident with the long side direction of the chassis 13. A plurality of the cold cathode fluorescent lamps 19 are aligned, with their axes nearly parallel each other, and with a prescribed spacing between each other. In addition, a rubber holder 20 is respectively fitted to both ends of the cold cathode fluorescent lamp 19, and this rubber holder 20 is inserted into a mounting hole in the chassis 13, so as to mount the cold cathode fluorescent lamp 19 in the chassis 13.

Figure 5:
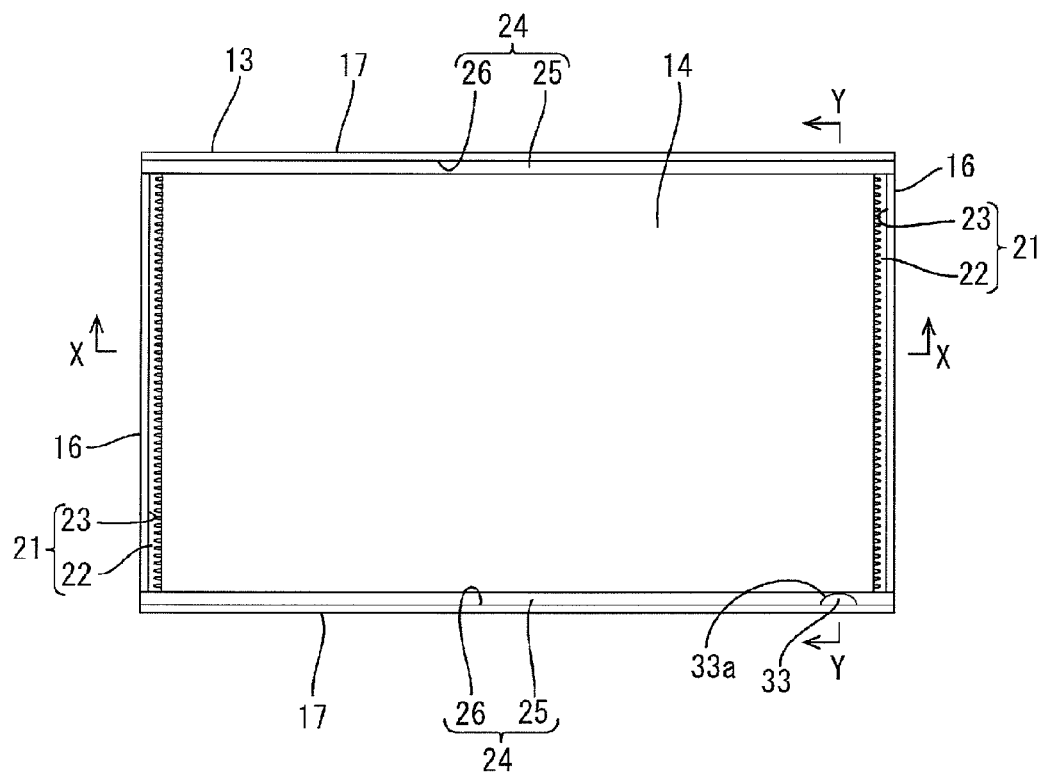
FIG. 5 is a plan view showing a mounted-state of a lamp holder and a holder in a chassis.

The positioning member is constituted of a lamp holder 16 and a holder 17 as a receiving member for receiving the optical member 15 on the backside, and a frame 18 in a frame shape as a holding member for holding the optical member 15 from the front side. As shown in FIG. 5, the lamp holder 16 and the holder 17 are forming a frame shape on the whole by being arranged in the outer circumferential end position of the chassis 13, and constituted so as to receive nearly the entire outer circumferential end of the optical member 15 on the backside.

The lamp holder 16 is made of synthetic resin (for example, polycarbonate or polypropylene), and as shown in FIGS. 5 and 6, a pair thereof is mounted in both end positions in the long side direction of the chassis 13, while extending along the short side direction of the chassis 13. The lamp holders 16 form a nearly box shape, opening in the rear surface, and are constituted so as to collectively cover each rubber holder 20 attached to each cold cathode fluorescent lamp 19 from the front side. Formed in a manner so as to be recessed in steps in the end of the inner circumferential side on the front surface of the lamp holder 16 is a receiving member 21 capable of receiving the optical member 15. The receiving member 21 comprises a plate surface receiving surface 22 opposed to the plate surface along the surface direction in the optical member 15 and receiving this plate surface, and an end surface receiving surface 23 opposed to an outer circumferential end surface 15b along the thickness direction in the optical member 15 and receiving the outer circumferential end surface 15b. The plate surface receiving surface 22 can determine the position of the optical member 15 in a direction orthogonal to its surface direction (thickness direction), while the end surface receiving surface 23 can determine the position of the optical member 15 in its surface direction. The plate surface receiving surface 22 is nearly in parallel with the plate surface of the optical member 15, while the end surface receiving surface 23 is nearly in parallel with the outer circumferential end surface 15b of the optical member 15.

The holder 17 is made of synthetic resin (for example, polycarbonate or polypropylene), and as shown in FIGS. 5 and 7, a pair thereof is mounted in both end positions in the short side direction of the chassis 13, while extending along the long side direction of the chassis 13. Formed in a manner so as to be recessed in steps in the end of the inner circumferential side on the front surface of the holder 17 is a receiving member 24 capable of receiving the optical member 15. This receiving member 24 has structure and function similar to those of the receiving member 21 in the lamp holder 16 (a plate surface receiving surface 25 and an end surface receiving surface 26), and a repetitive description thereof is omitted.

Figure 7:
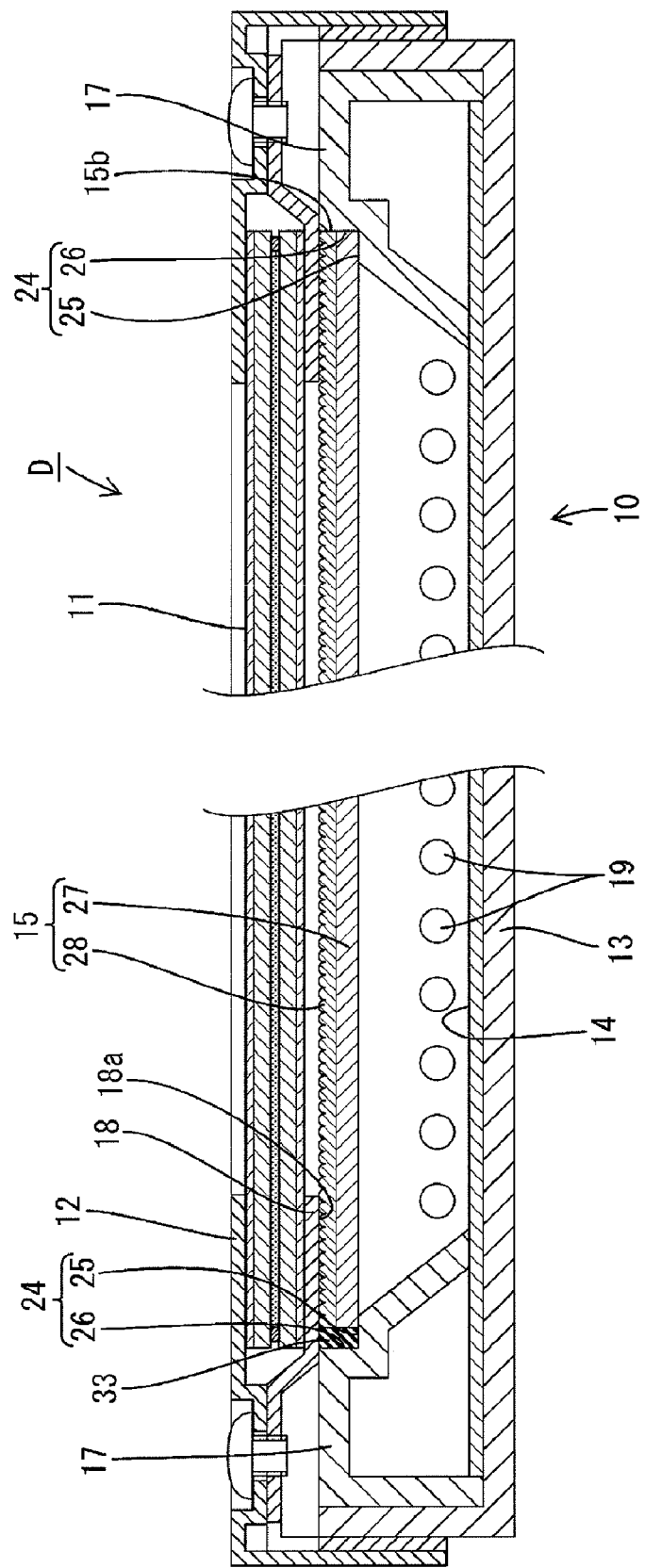
FIG. 7 is a cross sectional view of the liquid crystal display device taken along a line Y-Y shown in FIG. 5.

The frame 18 is made of a metal and formed in a frame shape, and, as shown in FIGS. 6 and 7, constituted so as to hold nearly the entire outer circumferential end of the optical member 15 from the front side. The frame 18 has in the inner circumferential end thereof a holding surface 18a opposed to the plate surface of the optical member 15. In a fitted state, the holding member 18a is disposed in a position with a slight clearance relative to the plate surface of the front side of the optical member 15, and thereby allowing heat expansion and heat contraction of the optical member 15.

The optical member 15 transforms a linear light emitted from each cold cathode fluorescent lamp 19 as a linear light source into a surface light, while having functions such as for directing the light toward the display region in the liquid crystal panel 11. The optical member 15 is formed into a laterally long rectangular shape similar to the liquid crystal panel 11 and the chassis 13, and is constituted by sticking the diffuser sheet 27 disposed in the backside and the lens sheet 28 disposed in the front side together. The diffuser sheet 27 has a base material made of translucent synthetic resin, and countless light scattering particles are dispersed therein for scattering the light.

Figure 8:
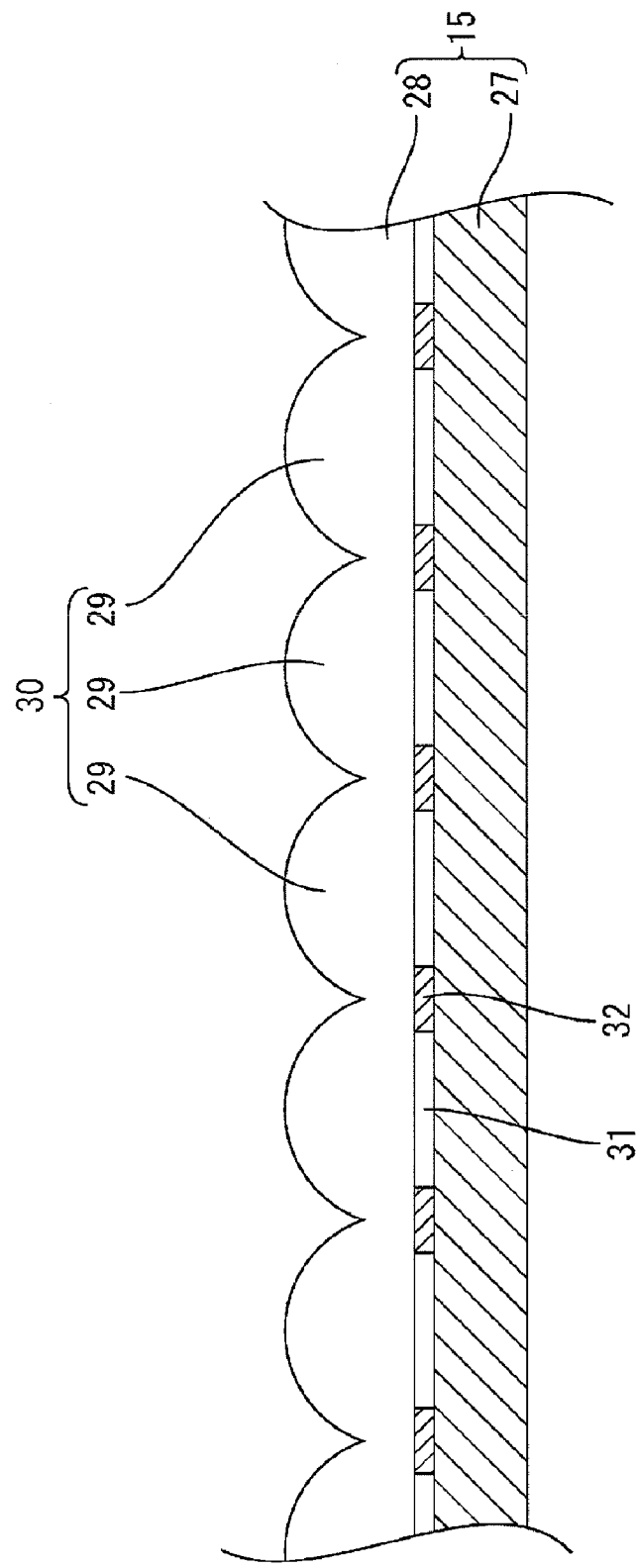
FIG. 8 is an enlarged cross sectional view of the optical member.
Figure 9:
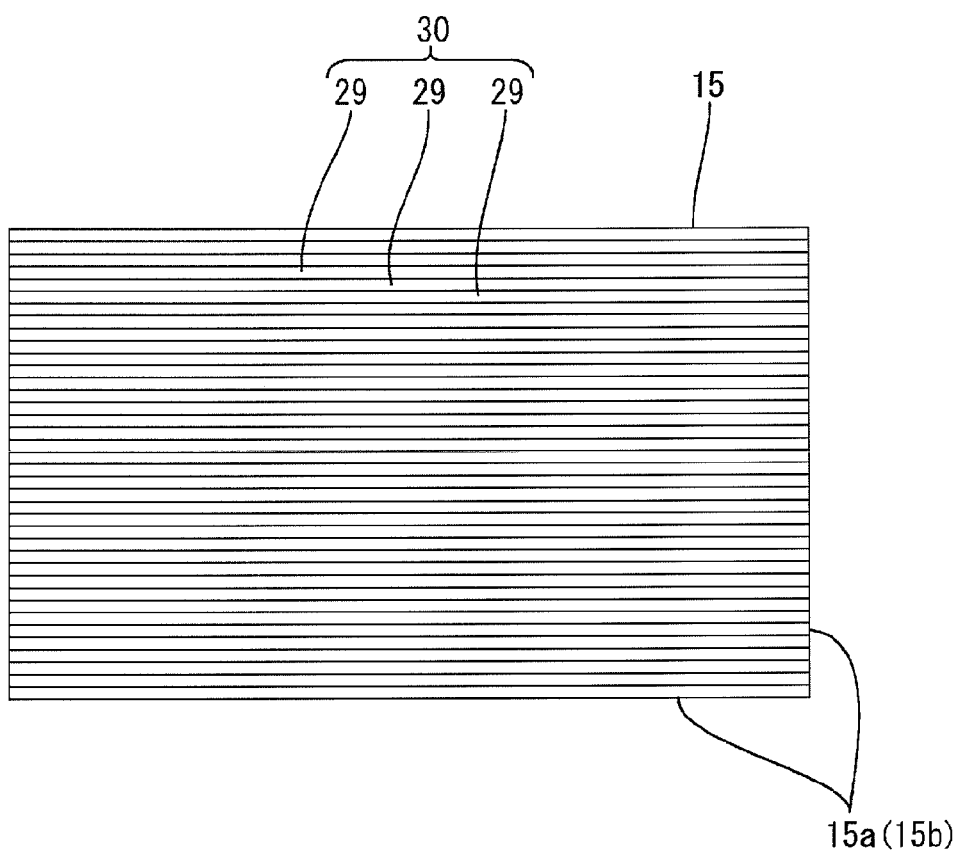
FIG. 9 is a plan view showing an outline of the arrangement of unit lenses in the optical member.

The lens sheet 28 is, as shown in FIGS. 8 and 9, provided with a lens portion 30 having a large number (a plurality) of unit lenses 29 aligned on the front surface (the light-emitting surface), while on the rear surface (the incident surface), provided with a reflecting layer 32 having an opening 31 corresponding to the lens portion 30. The unit lens 29 is a cylindrical lens in a nearly semicircular column shape, extending along the long side direction of the optical member 15. The lens portion 30 is a lenticular lens portion 30 having a large number of the cylindrical lenses as the unit lenses 29 aligned in a manner so as to direct their extending direction (length direction) in parallel each other. The length direction of each unit lens 29 is nearly in parallel with the edge 15a in the long side in the optical member 15, while the arrangement direction orthogonal to the length direction of each unit lens 29 is nearly in parallel with the edge 15a in the short side in the optical member 15. In short, the unit lenses 29 are arranged in parallel with the edge 15a in the optical member 15.

The reflecting layer 32 is made of such as transparent resin wherein, for example, white oxidized titanium particles are dispersedly incorporated, and has the above-mentioned opening 31 corresponding to the focus position of each unit lens 29. The reflecting layer 32 and the opening 31 intervenes between the lens sheet 28 and the diffuser sheet 27. The reflecting layer 32 and the opening 31 form a streaky shape with a prescribed width in nearly parallel with the length direction of the unit lenses 29, and forming a stripe shape on the whole. The reflecting layer 32 is formed in a prescribed width area having the valley part of each unit lens 29 as the center, while the opening 31 is formed in a prescribed width area having the top of each unit lens 29 as the center. In addition, the opening 31 is an air layer, and its refractive index is different from those of the diffuser sheet 27 and the lens sheet 28. The arrangement spacing of the unit lenses 29 (lens pitch) and that of the reflecting layer 32 (reflecting layer pitch) is designed to be almost the same, and is for example 140 μm.

When the light irradiated from each cold cathode fluorescent lamp 19 passes through the opening 31, it enters in the unit lens 29 as it is, and then is emitted therefrom with its directionality directed toward the display region in the liquid crystal panel 11. On the other hand, the light which does not pass through the opening 31 reflects on the reflecting layer 32 and returns to the side of the cold cathode fluorescent lamp 19, so as to reflect again on such as the reflective sheet 14. Reuse of the light is attempted by repeating such reflection until it passes through the opening 31. In addition, the optical member 15 can properly control the emitting direction of light (diffusing angle) by adjusting the ratio between the widths of the reflecting layer 32 and the opening 31.

The manufacturing method of the optical member 15 is simply explained. The optical member 15 is manufactured by sticking the lens sheet 28 and the diffuser sheet 27, that have been respectively and separately manufactured, together with such as an adhesive. In the manufacturing process of the lens sheet 28, after applying the reflecting layer 32 of positive type to the entire area of the rear surface of the lens sheet 28, light is irradiated from the front, so that only the reflecting layer 32 corresponding to the forming area of the opening 31 is exposed. This exposed reflecting layer 32 is then eliminated. Thereby, the opening 31 corresponding to the focus position of the unit lens 29 is formed.

However, the liquid crystal display device D using the above-mentioned optical member 15 may have a problem as below. In short, so-called moire may appear due to the interference between the arrangement of the unit lenses 29 and the arrangement of the pixel electrodes PE, depending on the relationship between the arrangement spacing of each unit lens 29 shown in FIG. 9 and that of the reflecting layer 32 in the optical member 15 and the relationship between the pitch between each wiring SL and GL in the liquid crystal panel 11 shown in FIG. 4 and the arrangement spacing of the pixel electrodes PE. In such case, the display quality is extremely degraded. As a method for avoiding such moire, conventionally, a general lens sheet with a lens portion but without a reflecting layer and an opening, which has a particular structure wherein the arrangement of the unit lenses is inclined relative to the edge, has been conventionally used. With such lens sheet, the interference between the arrangement of the pixel electrodes PE and that of the unit lenses in the liquid crystal panel 11 can be resolved.

However, with such a particular configuration wherein the unit lenses are inclined relative to the edge as mentioned above, the production cost increases even with a general lens sheet, and moreover, the manufacturing itself of the optical member 15 having the reflecting layer 32 and the opening 31 on the rear surface of the lens sheet 28 according to the present embodiment is extremely difficult. In addition, even in the case of manufacturing the lens sheet 28 where, for example, a large base material comprising the unit lenses 29 aligned in parallel with the edge is firstly produced and each lens sheet 28 is punched out from the base material, the material utilization efficiency is deteriorated when each lens sheet 28 is punched out with its edge inclined relative to the edge of the base material, resulting in an increased cost.

For the purpose of solving the above problem, the present embodiment uses the optical member 15 wherein the unit lenses 28 are arranged in parallel with the edge 15a, while being provide with a protrusion 33 as an inclined posture supporting member for supporting the optical member 15 in a posture so that the edge 15a of the optical member 15 and the arrangement of the unit lenses 29 are inclined relatively to the arrangement of the pixel electrodes PE in the liquid crystal panel 11. This protrusion 33 intervenes between the optical member 15 and the positioning member, and is disposed in the side of the positioning member (the frame 18, the lamp holder 16 and the holder 17) among both members.

In details, the protrusion 33 is, as shown in FIG. 5, provided in the holder 17 constituting the long side of the receiving member. The protrusion 33 is provided only in the holder 17 disposed in the vertically lower side (the lower side in FIG. 5, the left side in FIG. 7) in use state of the liquid crystal display device D, and is not provided in elsewhere in the holder 17 in the vertically upper side and in both lamp holders 16 positioned in both sides.

The protrusion 33 protrudes partially from the vicinity of the right end position shown in FIG. 5 in the receiving member 24 in the vertically lower side of the holder 17. The protrusion 33 is disposed in the position slightly front side from the end position in the length direction of the holder 17. This protrusion 33 is made of a rubber material (for example, such as PORON (R)) as a body separated from the holder 17, and capable of being selectively mounted to the holder 17. The protrusion 33 is made of a rubber material, and thereby capable of elastic deformation. The protrusion 33 is fixed to the holder 17 by a fixing means such as a double sided tape and an adhesive. The protrusion 33 has nearly flat surfaces on the surfaces opposed to the plate surface receiving surface 25 and the end surface receiving surface 26 in the receiving member 24 so as to fit with the opposed surface, and is fixed to one of the plate surface receiving surface 25 and the end surface receiving surface 26, or to both of them.

The protrusion 33 forms a nearly arch shape laterally long along the length direction of the holder 17, and this nearly circular arc surface is a supporting surface 33a that abuts the end surface 15b facing vertically downward in the outer circumferential end surface 15b in the optical member 15. The optical member 15 is supported by this protrusion 33, and thereby held in a posture so that the edge 15a is inclined relative to the edge 11a in the liquid crystal panel 11. In addition, the height of the protrusion 33 is designed to be nearly the same as or lower than the thickness of the optical member 15.

The liquid crystal display device D as configured above is produced as followings. Each liquid crystal panel 11 and the backlight 10 is produced, and then fitted together using such as a bezel 12, so as to produce the liquid crystal display device D. The backlight 10 is manufactured by, after firstly laying the reflective sheet 14 inside of the chassis 13, mounting each cold cathode fluorescent lamp 19 having the rubber holders 20 fitted to both ends into the chassis 13, then sequentially mounting the lamp holder 16 and the holder 17, then the optical member 15 and then the frame 18 into the chassis 13.

Here, regarding the liquid crystal display device D, the screen size and the number of pixels of the liquid crystal panel 11 differ according to the model, and thus, the arrangement of the pixel electrodes PE of the liquid crystal panel 11 also differs. Therefore, depending on the model of the liquid crystal display device D, the arrangement of the unit lenses 29 in the optical member 15 and the arrangement of the pixel electrodes PE in the liquid crystal panel 11 may possibly interfere, and in such a case, display defect called moire may appear. In such a case, as shown in FIGS. 5 and 7, the protrusion 33 is attached to the holder 17 disposed in the vertically lower side in use state of the liquid crystal display device D. This attaching operation of the protrusion 33 can be conducted in any phases before or after mounting the holder 17 into the chassis 13.

Figure 10:
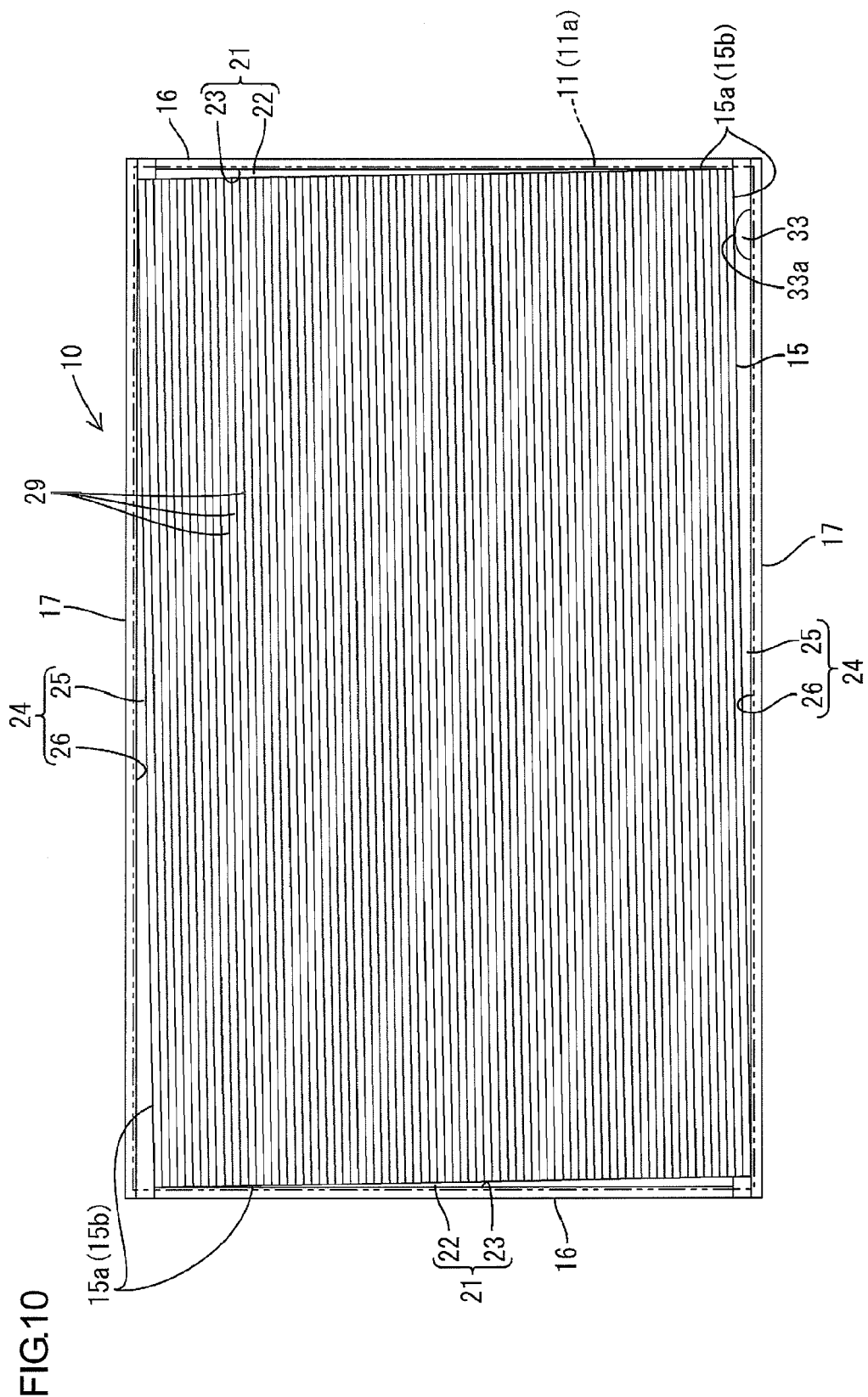
FIG. 10 is a plan view showing a state where the optical member is put onto a lamp holder and a holder with the protrusion attached thereto.

When the optical member 15 is put onto the receiving members 21 and 24 in the lamp holder 16 and the holder 17 with the protrusion 33 attached to the holder 17, as shown in FIG. 10, the outer circumferential end surface 15b in the vertically lower side in the optical member 15 in use state abuts the supporting surface 33a of the protrusion 33, so that the right end part of the optical member 15 in FIG. 10 is held up. Accordingly, the optical member 15 is held in a posture so that the edge 15a is inclined relatively to the length direction of the lamp holder 16 and the holder 17 (the surface direction of the end surface receiving surfaces 23 and 26). In this state, other than the portion abutting the protrusion 33, only the corner portions in the four corners in the outer circumferential end surface 15b in the optical member 15 abut the end surface receiving surfaces 23 and 26 in the lamp holder 16 and the holder 17, while other portions are apart from the end surface receiving surfaces 23 and 26. In other words, clearances are secured between the optical member 15 supported in an inclined posture and the end surface receiving surfaces 23 and 26. In addition, in this inclined posture, each plate surface receiving surface 22 and 25 does not entirely abut the optical member 15, and therefore abutting a prescribed triangle area in the outer circumferential end part in the optical member 15.

Figure 11:
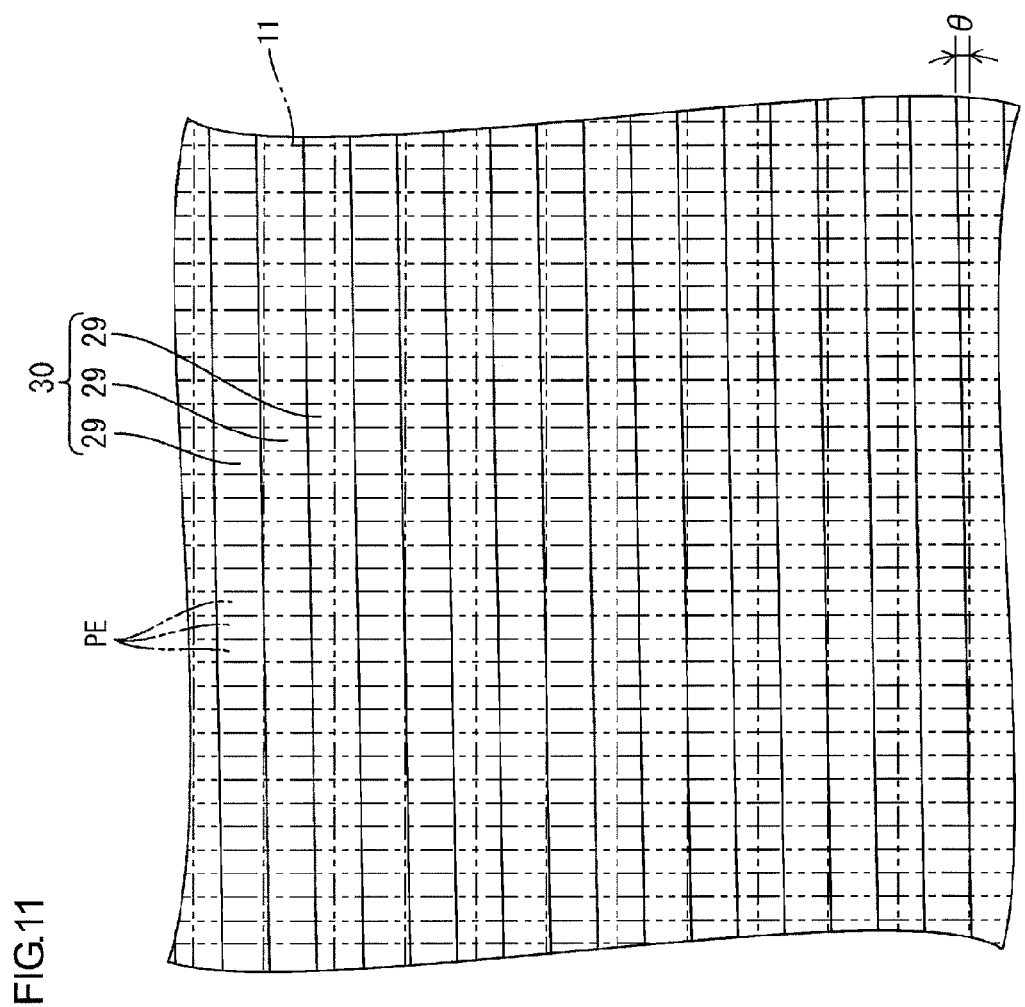
FIG. 11 is a explanation view showing a relationship between the arrangement of the unit lenses and the arrangement of the pixel electrodes.

After that, fitting the frame 18 and the liquid crystal panel 11 holds the liquid crystal panel 11 in a posture so that the edge 11a is in parallel with the length direction of the lamp holder 16 and the holder 17 as shown with a dashed-two dotted line in FIG. 10. Accordingly, the edge 15a in the optical member 15 is in a posture inclined relatively to the edge 11a in the liquid crystal panel 11. Here, as shown in FIG. 11, the arrangement of the unit lenses 29 and the reflecting layer 32 in the optical member 15 is inclined relatively to the arrangement of the pixel electrodes PE in the liquid crystal panel 11 by the inclined angle θ of the optical member 15. This can prevent the occurrence of moire in an image to be displayed on the liquid crystal panel 11. Moreover, even when heat expansion and heat contraction occurred to the optical member 15 at the time of lighting each cold cathode fluorescent lamp 19, the protrusion 33 made of a rubber material is capable of elastic deformation, and furthermore, clearances are secured between the outer circumferential end surface 15b in the optical member 15 and the end surface receiving surfaces 23 and 26. Therefore, the optical member 15 is allowed for expansion and contraction, thereby preventing the occurrence of sagging of the optical member 15. Additionally, the optical member 15 in an inclined posture overlaps the whole display region in the liquid crystal panel 11, though not overlapping the whole area of the liquid crystal panel 11.

The relationship between the inclined angle θ of the optical member 15 and the moire level is described with concrete examples. With the liquid crystal pane 11 and the optical member 15 under the following conditions, the moire level is evaluated as changing the inclined angle θ of the optical member 15. The result is shown in the following Table 1.

The condition of the liquid crystal panel . . . screen size: 45-inch, number of pixels: 1920×1080, pixel pitch in the long side: around 513 μm, pixel pitch in the short side: around 171 μm The condition of the optical member . . . lens pitch and reflecting layer pitch: around 140 μm

TABLE 1

| Inclined angle θ | Evaluated moire level |
| --- | --- |
| 0 | X |
| 1 | X |
| 2 | Δ |

TABLE 1-continued

| Inclined angle θ | Evaluated moire level |
|---|---|
| 3 | ◯ |
| 4 | ◎ |
| 5 | ◯ |
| 10 | ◯ |

According to Table 1, when the inclined angle θ was 0 and 1 degree, moire improvement had barely appeared, however, when the inclined angle θ was within the angle range of 2 to 10 degrees, moire improvement had been obtained. Particularly, the angle range between 3 to 10 degrees was preferable, and almost no moire had been visibly-confirmed. Among them, when the inclined angle θ was 4 degrees, no moire had been visibly-confirmed, and can be regarded as the most preferable.

Figure 12:
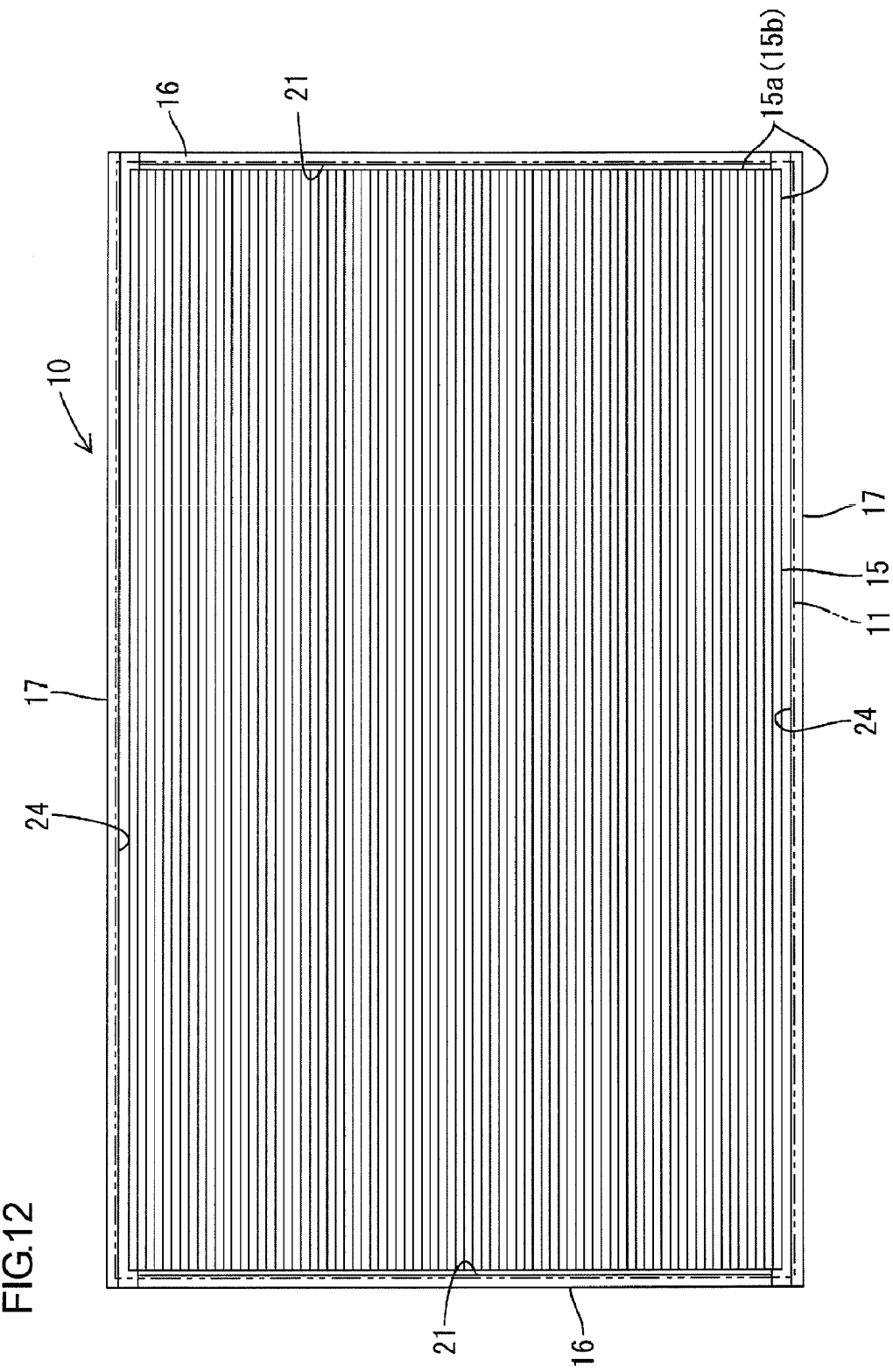
FIG. 12 is a plan view showing a state where the optical member is put onto a lamp holder and a holder without the protrusion attached thereto.

On the other hand, regarding the models with no concern for moire, as shown in FIG. 12, the optical member 15 is put onto the receiving members 21 and 24 in the lamp holder 16 and the holder 17 without attaching the protrusion 33 to the holder 17. In this case, the outer circumferential end surface 15b of the optical member 15 is received by the end surface receiving surface 26 in the receiving member 24 in both holders 17, with the edge 15a in nearly parallel with the length direction of both holders 17.

As described in the above, according to the present embodiment, an inclined posture supporting member (the protrusion 33) for supporting the optical member 15 in a posture so that the edge 15a in the optical member 15 and the arrangement of the unit lenses 29 are inclined relatively to the arrangement of the pixel electrodes PE formed in the liquid crystal panel 11 intervenes between the optical member 15 and the holder 17 as the positioning member, and therefore, while using the optical member 15 comprising the lens portion 30 having the unit lenses 29 aligned in parallel with the edge 15a, the occurrence of moire caused by the interference between the arrangement of the pixel electrodes PE in the liquid crystal panel 11 and the arrangement of the unit lenses 29 can be avoided. Accordingly, a measure can be taken against moire without using a particular optical member in which the unit lenses are arranged while being inclined relative to the edge.

In addition, the inclined posture supporting member is composed of the protrusion 33 partially protruding from one of the opposed surfaces of the optical member 15 and the holder 17 as the positioning member, so that the supporting posture of the optical member 15 can be appropriately adjusted by designing the shape of the protrusion 33. Additionally, the protrusion 33 is provided in the side of the holder 17 as the positioning member, so as to simplify the production, compared to the case where the protrusion 33 is supposedly provided in the side of the optical member 15.

And also, the protrusion 33 is a body separated from the holder 17 as the positioning member and capable of being selectively mounted to the holder 17. Mounting of the protrusion 33 can therefore be cancelled, when, depending on the combination between the liquid crystal panel 11 and the optical member 15 to be used, moire is not concerned to occur. Accordingly, the holder 17 can be shared without concerning necessity of taking measures against moire.

In addition, the protrusion 33 is made of a rubber material, and thereby, even when heat expansion and heat contraction occurs to the optical member 15, the protrusion 33 elastically deforms so as to allow the optical member 15 to expand and contract. This prevents the occurrence of sagging of the optical member 15, thereby preventing the degradation of display quality.

In addition, the protrusion 33 is placed only in the surface arranged in the vertically lower side in use state among the opposed surface to the optical member 15 in the holder 17 as the positioning member, so that the minimum protrusion 33 can surely support the optical member 15 in the inclined posture, and thereby achieving a cost reduction. In addition, the optical member 15 is supported only in the vertically lower side by the protrusion 33, and thus, even when there occurs heat expansion and heat contraction to the optical member 15, its expansion and contraction can be allowed.

The protrusion 33 is provided in the holder 17 that is the receiving member among the positioning member for receiving the optical member 15 on the backside, and therefore, when mounting the optical member 15, the supporting posture of the optical member 15 can be determined at the same time of putting the optical member 15 onto the holder 17 as the receiving member, and thereby developing good workability.

And also, the optical member 15 is provided with the lens portion 30 on the light-emitting surface, whereas, on the incident surface in the opposite side, provided with the reflecting layer 32 having the opening 31 corresponding to the focus position of the unit lenses 29. For the thus configured optical member 15, the present embodiment is particularly effective, since it is extremely difficult to produce the one having the unit lenses 29 inclined relative to the edge 15a.

<Embodiment 2>

Figure 13:
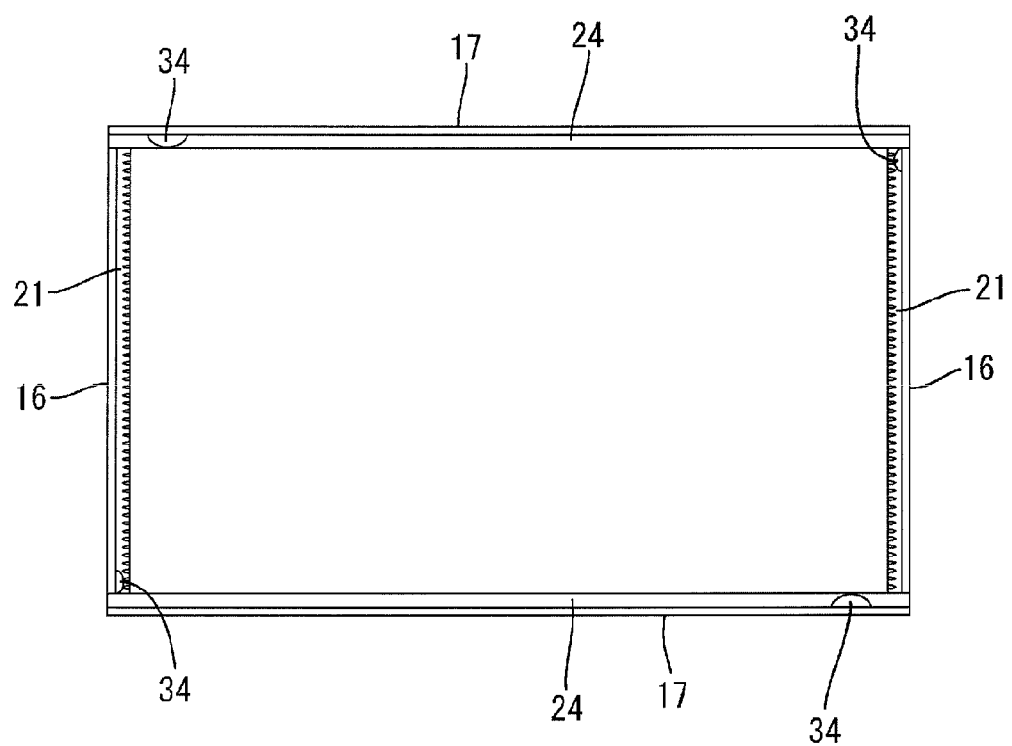
FIG. 13 is a plan view showing a mounted-state of the lamp holder and the holder in a chassis accordingly to Embodiment 2 in the present invention.
Figure 14:
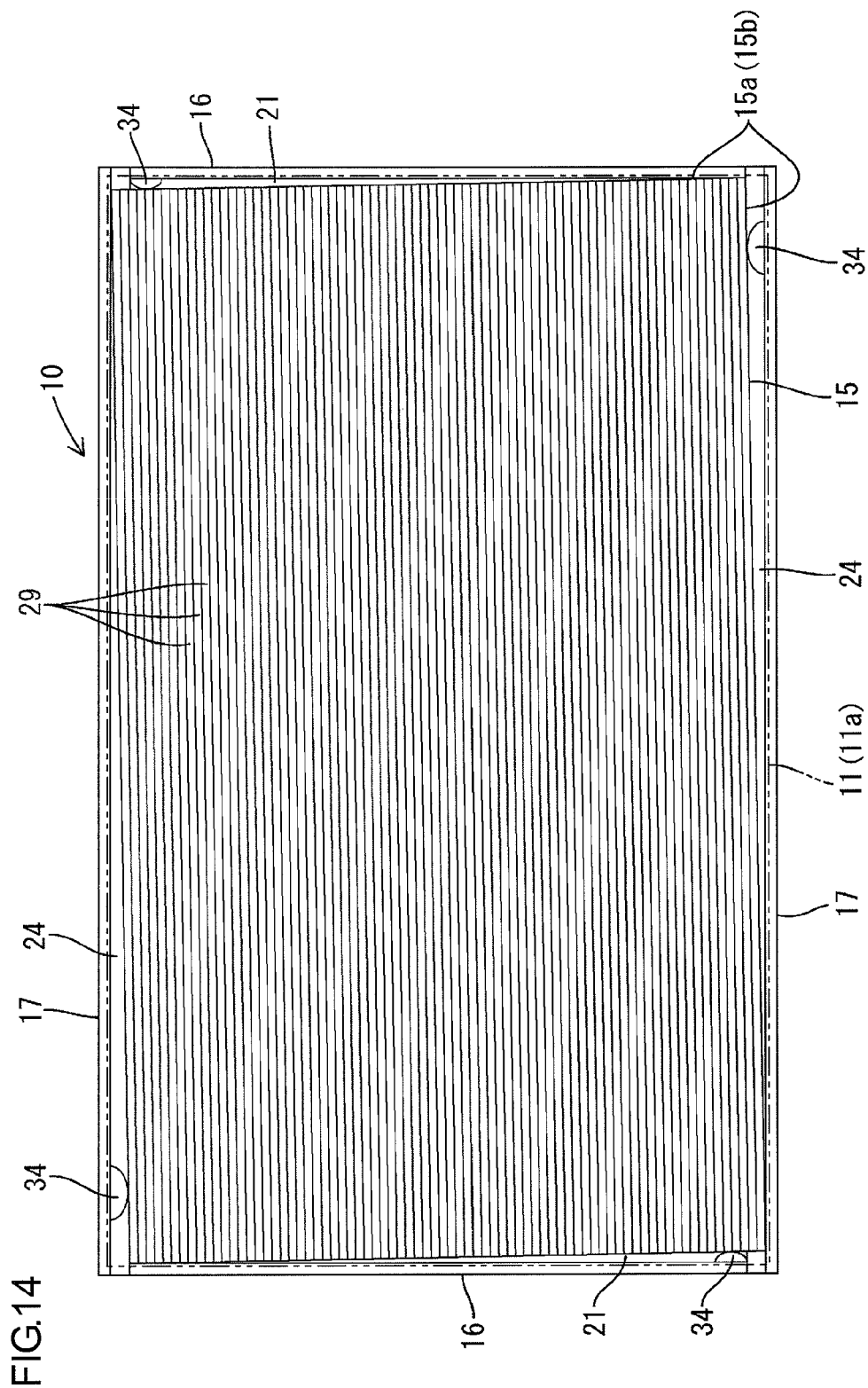
FIG. 14 is a plan view showing a state where the optical member is put onto the lamp holder and the holder.

Embodiment 2 of the present invention is explained in reference to FIG. 13 or 14. In Embodiment 2, such as the arranging position of a protrusion 34 is changed. Additionally, in Embodiment 2, a repetitive description of the structure, action, and effect similar to those in the above Embodiment 1 is omitted.

As shown in FIG. 13, the protrusion 34 constituting the inclined posture supporting member is respectively provided in all of both lamp holders 16 and both holders 17 which compose the receiving member. In details, in the holder 17 disposed in the vertically lower side in use state, the protrusion 34 is placed in the vicinity of the right end position shown in FIG. 13 in the receiving member 24, while in the holder 17 disposed in the vertically upper side, the protrusion 34 is placed in the vicinity of the left end position in the same figure in the receiving member 24. On the other hand, in the lamp holder 16 disposed in the right side in the same figure in use state, the protrusion 34 is placed in the vicinity of the vertically upper side of the receiving member 21, while in the lamp holder 16 disposed in the left side in the same figure, the protrusion 34 is placed in the vertically lower side in the receiving member 21.

When the optical member 15 is put on, as shown in FIG. 14, the corresponding protrusions 34 respectively abut each end surface 15b adjacent in the circumferential direction in the outer circumferential end surface 15b of the optical member 15, and thereby the optical member 15 is held in a posture so that the edge 15a is inclined relative to the length direction of the lamp holder 16 and the holder 17. This prevents the occurrence of interference between the arrangement of the unit lenses 29 and the arrangement of the pixel electrodes PE in the liquid crystal panel 11.

As described above, according to the present embodiment, among the opposed surfaces to the optical member 15 in the holder 17 and the lamp holder 16 constituting the receiving member among the positioning member, the protrusion 34 is respectively provided in each surface adjacent in the circumferential direction, so as to firmly support the optical member 15.

<Embodiment 3>

Figure 15:
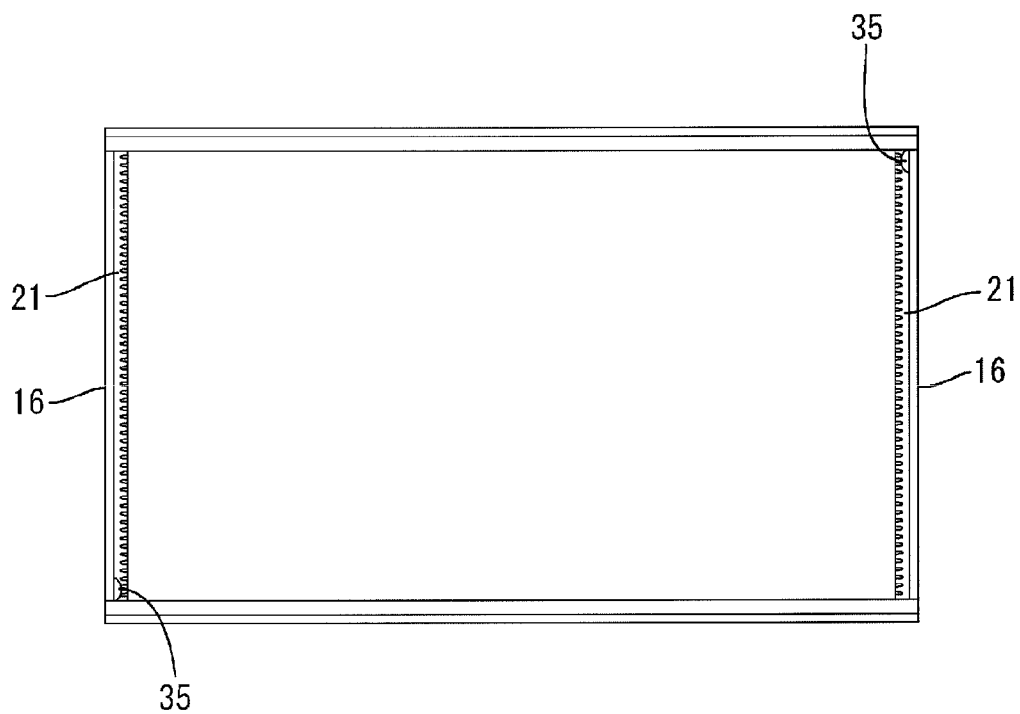
FIG. 15 is a plan view showing a mounted-state of the lamp holder and the holder in a chassis accordingly to Embodiment 3 in the present invention.
Figure 16:
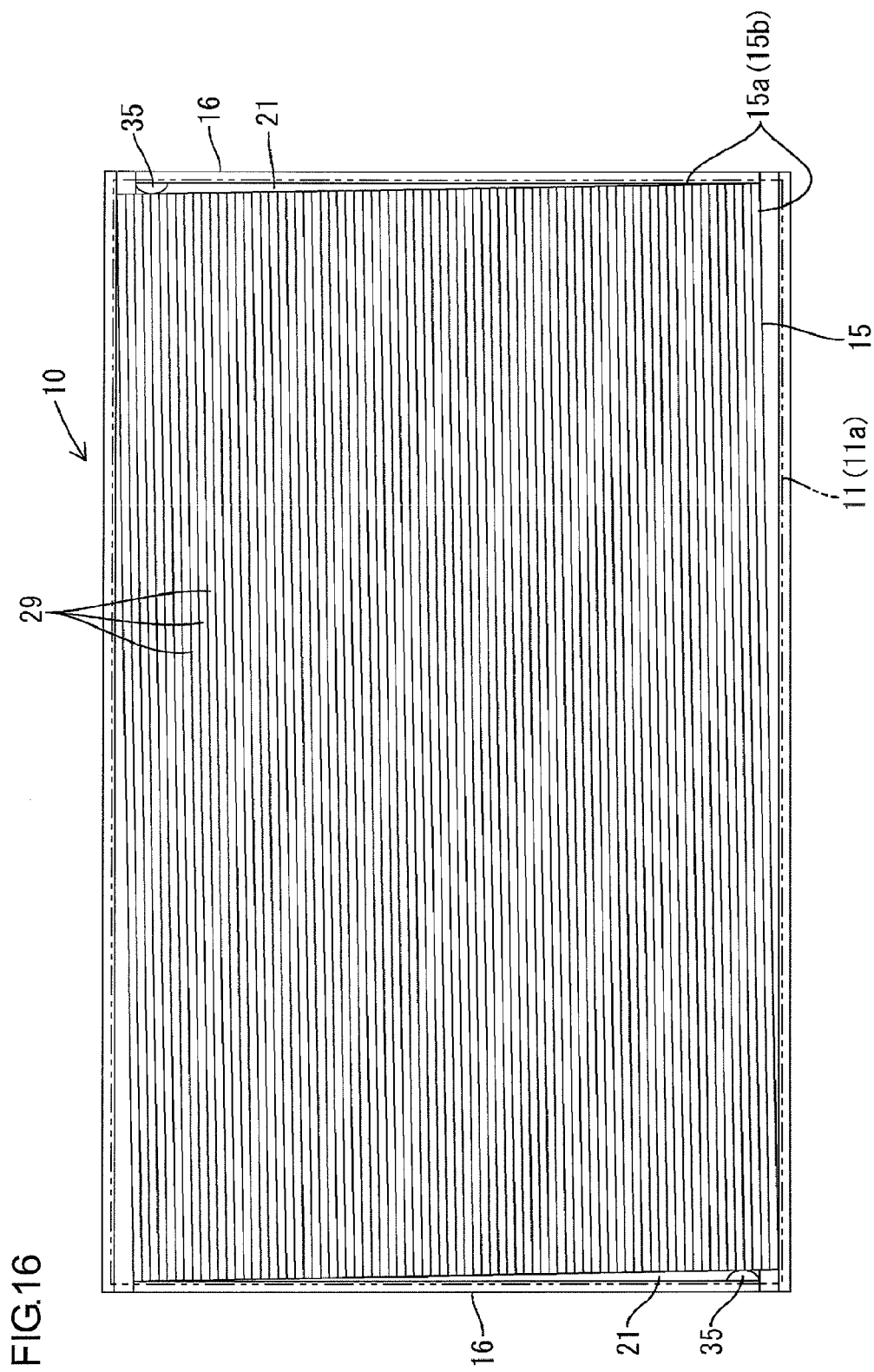
FIG. 16 is a plan view showing a state where the optical member is put onto the lamp holder and the holder.

Embodiment 3 of the present invention is explained in reference to FIG. 15 or 16. In Embodiment 3, such as the arranging position of a protrusion 35 is changed. In Embodiment 3, a repetitive description of the structure, action, and effect similar to those in the above Embodiment 1 is omitted.

As shown in FIG. 15, the protrusion 35 constituting the inclined posture supporting member is respectively provided in both lamp holders 16 disposed in both sides in the receiving member in use state. In details, in the lamp holder 16 disposed in the right side in the same figure in use state, the protrusion 35 is placed in the vicinity of the vertically upper side of the receiving member 21, while in the lamp holder 16 disposed in the left side in the same figure, the protrusion 35 is placed in the vertically lower side in the receiving member 21. When the optical member 15 is put on, as shown in FIG. 16, the corresponding protrusions 35 respectively abut the end surface 15b in the short side along the vertical direction in the outer circumferential end surface 15b of the optical member 15, and thereby the optical member 15 is held in a posture so that the edge 15a is inclined relative to the length direction of the lamp holder 16 and the holder 17. This prevents the occurrence of interference between the arrangement of the unit lenses 29 and the arrangement of the pixel electrodes PE in the liquid crystal panel 11.

<Embodiment 4>

Figure 17:
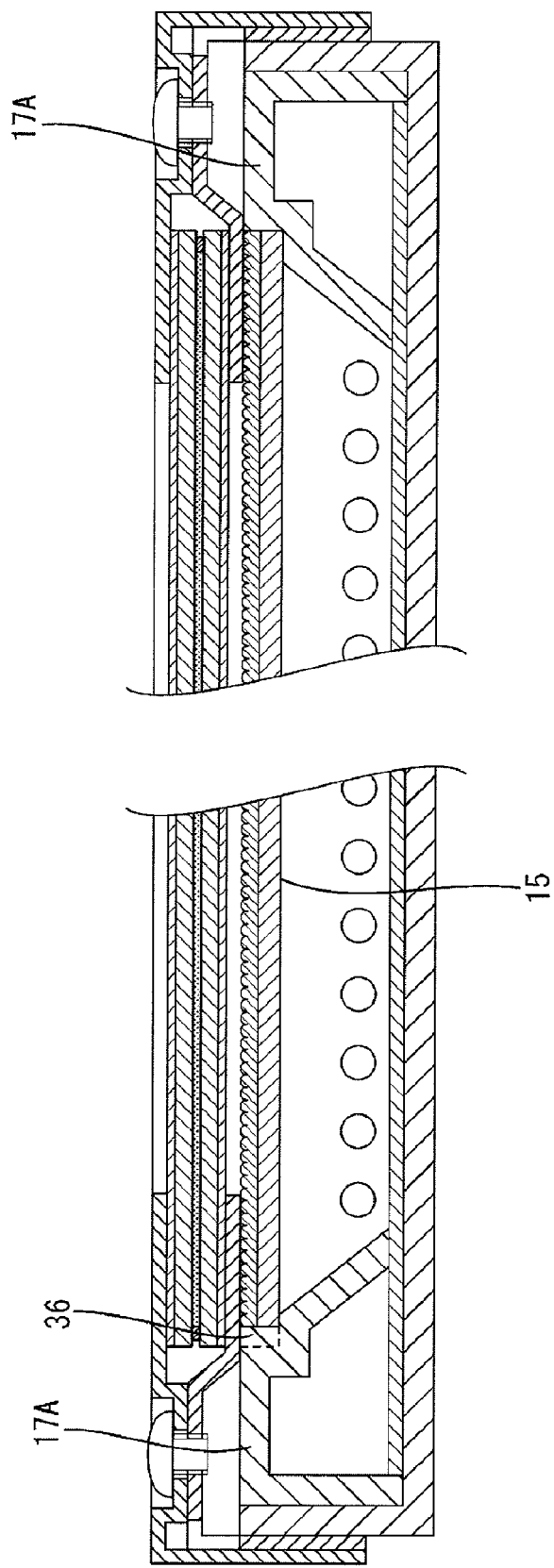
FIG. 17 is a cross sectional view of the liquid crystal display device according to Embodiment 4 in the present invention.

Embodiment 4 of the present invention is explained in reference to FIG. 17. In Embodiment 4, the case where the protrusion 36 is integrally formed with the holder 17A is shown. Additionally, in Embodiment 4, a repetitive description of the structure, action, and effect similar to those in the above Embodiment 1 is omitted.

As shown in FIG. 17, the protrusion 36 is integrally formed with only the holder 17A disposed in the vertically lower side in use state. The shape of the protrusion 36 is the same as Embodiment 1 (see FIG. 5), and the detailed description thereof is omitted. The shape of the forming die used for molding the holder 17 made of synthetic resin is designed so as to correspond to the protrusion 36, and thereby producing the holder 17A integrally comprising the protrusion 36. Integrally forming the protrusion 36 with the holder 17A as mentioned above can omit the mounting operation of the protrusion 36 to the holder 17A in the above Embodiments 1 to 3, and be at relatively low cost. And also, according to the present embodiment, the protrusion 36 can be mounted without forgetting, and moreover, the protrusion 36 does not drop off. Additionally, the protrusions 36 described in Embodiments 2 and 3 may also be integrally formed with the holder 17 and the lamp holder 17 in a similar way to the present embodiment.

<Embodiment 5>

Embodiment 5 of the present invention is explained in reference to FIGS. 18 to 21. In Embodiment 5, the receiving member is changed. Additionally, in Embodiment 5, a repetitive description of the structure, action, and effect similar to those in the above Embodiment 1 is omitted.

Figure 18:
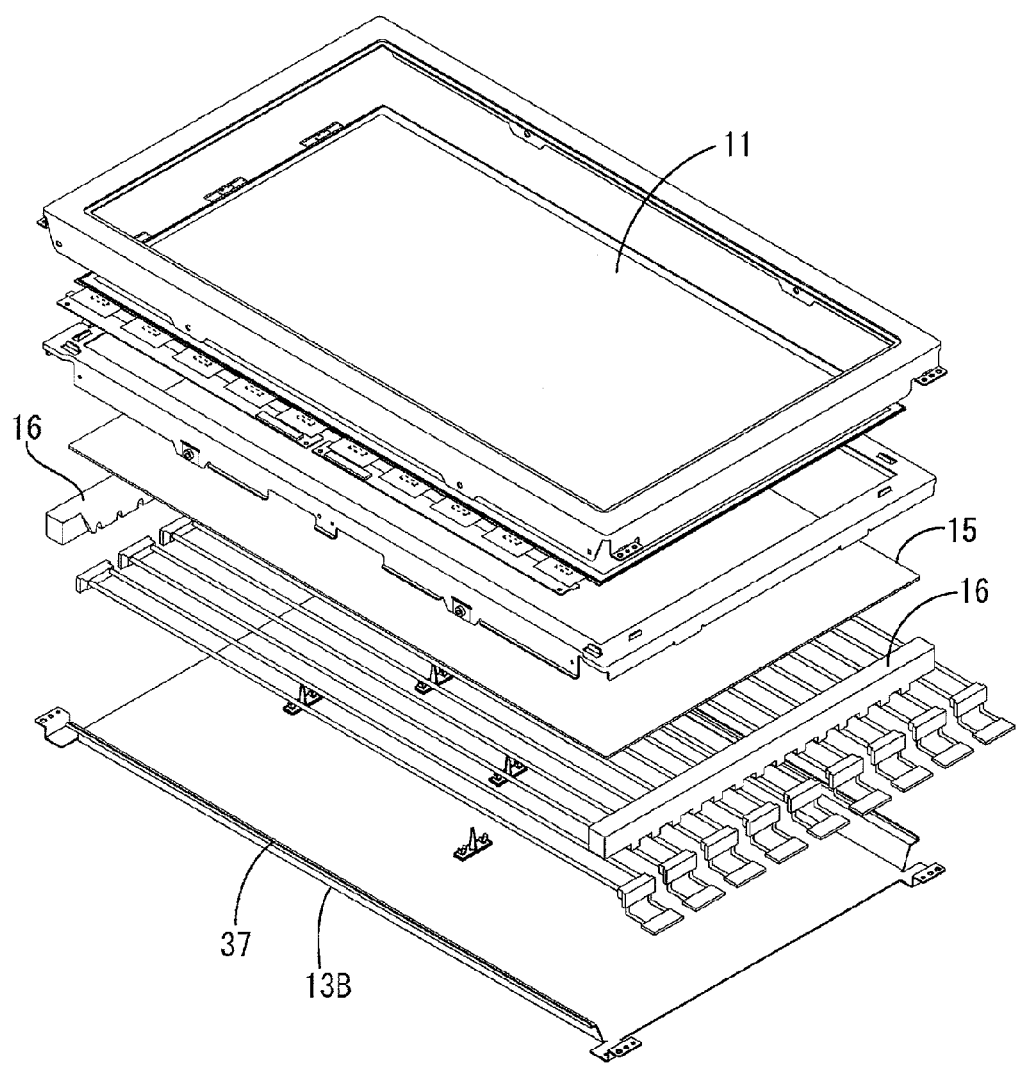
FIG. 18 is an exploded perspective view of the liquid crystal display device according to Embodiment 5 in the present invention.
Figure 19:
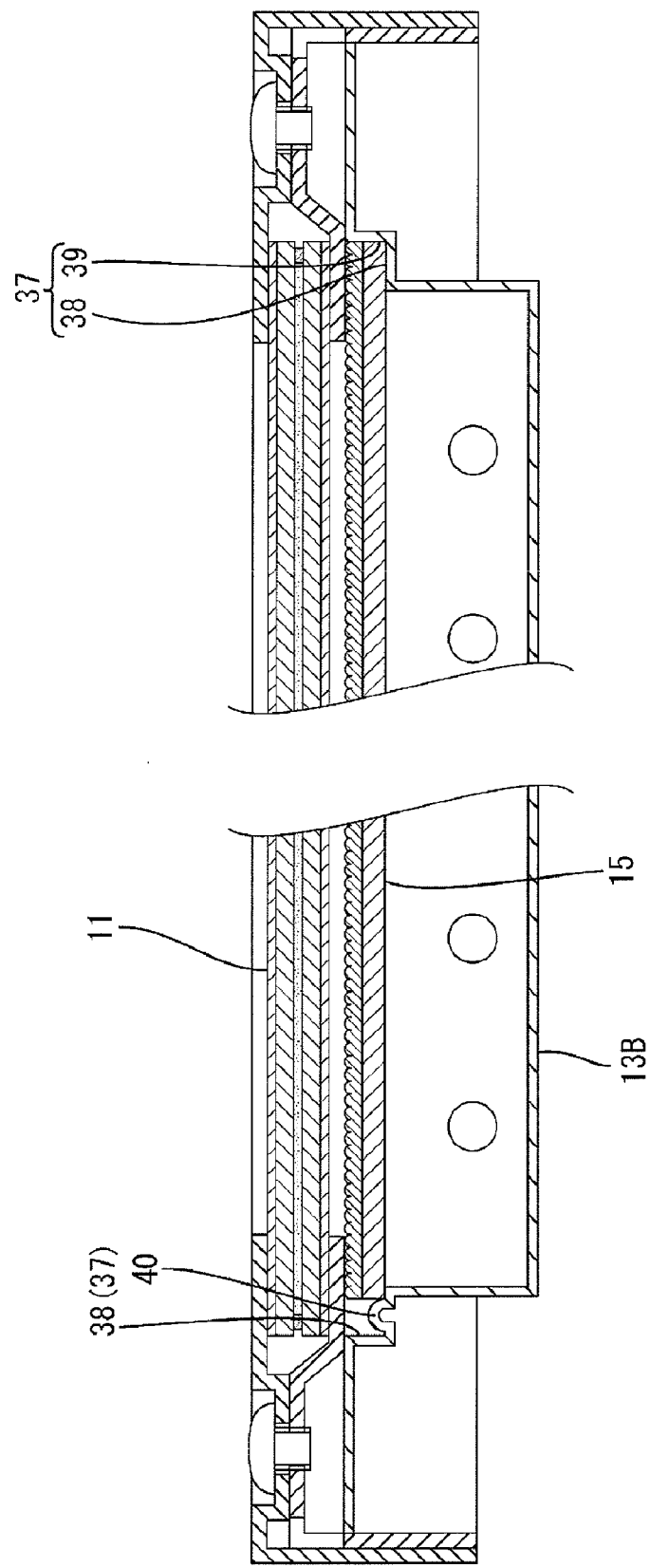
FIG. 19 is a cross sectional view of the liquid crystal display device.

In the present embodiment, as shown in FIG. 18, the receiving member is composed of a pair of lamp holders 16 mounted inside of the chassis 13B and a pair of receiving members 37 integrally formed with the chassis 13B. As shown in FIG. 19, the receiving member 37 is formed by folding each end in the long side in chassis 13B into a L-shaped sectional shape, and comprises a plate surface receiving surface 38 for receiving the plate surface of the optical member 15 and an end surface receiving surface 39 for receiving the outer circumferential end surface 15b of the optical member 15.

Figure 20:
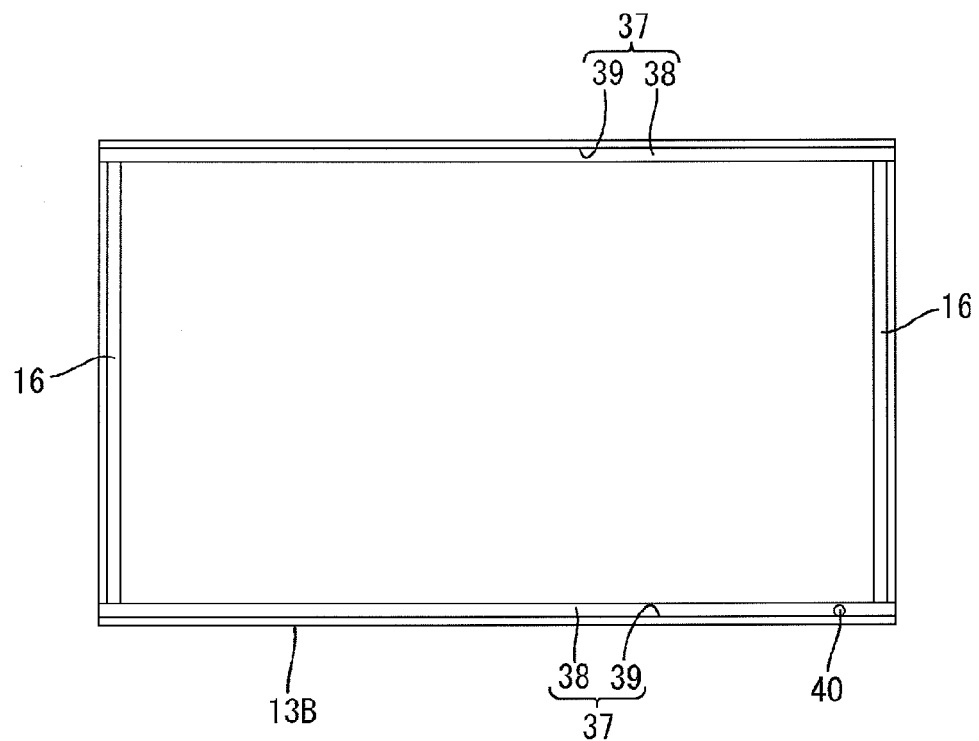
FIG. 20 is a plan view showing a mounted-state of the holder in the chassis.

And, a protrusion 40 is integrally formed in the receiving member 37 in the vertically lower side in use state among both the receiving members 37 in the chassis 13, as shown in FIGS. 19 and 20. The protrusion 40 is formed into a shape protruding to the front by punching the plate surface receiving surface 38 in the receiving member 37 out from the backside. The protrusion 40 is placed in the vicinity of the right end position shown in FIG. 20 in the receiving member 37, and constituted so as to support the end surface 15b facing the vertically lower side in the outer circumferential end surface 15b of the optical member 15. When the optical member 15 is put onto the lamp holder 16 and the receiving member 37, as shown in FIGS. 19 and 21, the protrusion 40 abuts the end surface 15b, and thereby the optical member 15 is held in a posture so that the edge 15a is inclined relatively to the edge 11a in the liquid crystal panel 11 to be fitted together later. This prevents the interference between the arrangement of the unit lenses 29 and the arrangement of the pixel electrodes PE in the liquid crystal panel 11, and thereby preventing the occurrence of moire.

<Other Embodiments>

The present invention is not limited to the aspects described in the above with reference to the accompanying figures, and, for example, the following can also be included in the technical scope of the present invention.

(1) Specific shape, number, arranging position, and material of the protrusion may be changed accordingly.

(2) As a further variation of the above Embodiment 5, the present invention includes the configuration where, for example, the receiving member in the lamp holder is omitted, while on the other hand, the receiving member is provided in the end part in the long side and in the end part in the short side of the chassis, so that only the chassis composes the receiving member. Furthermore, the present invention includes the configuration where a frame-shaped part as apart separated from the holder, the lamp holder, and the chassis may be used as the receiving member.

(3) In each of the above-mentioned embodiments, the protrusion is provided in the side of the receiving member, however, the protrusion may be provided in the side of the frame as the holding member, and such configuration is also included in the present invention. Additionally, both the receiving member and the holding member may be provided with the protrusion.

(4) In each of the above-mentioned embodiments, the protrusion is provided in the side of the positioning member, however, the protrusion may be provided in the outer circumferential end surface of the optical member, and such configuration is also included in the present invention. Additionally, both the positioning member and the optical member may be provided with the protrusion.

(5) In each of the above-mentioned embodiments, the protrusion is provided as the inclined posture supporting member, however, the configuration where the inclined posture supporting member is composed of a structure other than the protrusion is also included in the present invention.

(6) In each of the above-mentioned embodiments, the case where the unit lenses are arranged in parallel with the edge in the long side of the optical member is exemplified, however, the present invention can be also applied to the configuration where the unit lenses are arranged in parallel with the edge in the short side of the optical member.

(7) Regarding the lens portion, the present invention is applicable also to the optical member having a microlens portion composed of microlenses in a hemispherical shape as the unit lenses aligned in a matrix state, or the optical member having a cross lenticular lens portion composed of mutually-perpendicular cylindrical lenses as the unit lens arranged on the same plane.

(8) In each of the above-mentioned embodiments, the optical member, which comprises the reflecting layer having the opening in the incident surface side of the lens sheet while integrally comprising the diffuser sheet, is exemplified. However, the present invention is also applicable to the one not having the reflecting layer but having a lens sheet separated from the diffuser sheet.

(9) In each of the above-mentioned embodiments, the cold cathode fluorescent lamp is exemplified as a light source, however, the present invention is also applicable to the configuration where other kinds of linear light sources such as a hot cathode fluorescent lamp and a fluorescent tube or point light sources such as an LED are used as a light source.

(10) In each of the above-mentioned embodiments, the liquid crystal display device using the liquid crystal panel as a display panel is exemplified, however, the present invention is also applicable to a display using other kinds of display panels.

(11) In each of the above-mentioned embodiments, the television receiver comprising a tuner is exemplified, however, the present invention is also applicable to a display not comprising a tuner.

The invention claimed is:

1. An optical member unit, comprising:
an optical member capable of transmitting light irradiated toward a display panel and having a lens portion where a plurality of unit lenses are arranged in parallel with the edge,
a positioning member forming a nearly frame shape and capable of positioning the optical member in a prescribed posture relatively to the display panel, and
an inclined posture supporting member which is disposed between the optical member and the positioning member and supports the optical member in a posture so that the arrangement of the edge of the optical member and the unit lenses incline relatively to the arrangement of pixels formed on the display panel.

2. The optical member unit according to claim 1, wherein the inclined posture supporting member is composed of a protrusion partially protruding at least from one of the opposed surfaces of the optical member and the positioning member.

3. The optical member unit according to claim 2, wherein the protrusion is provided in the side of the positioning member.

4. The optical member unit according to claim 2, wherein the protrusion is formed as a body separated from the positioning member and the optical member, and constituted in a manner so as to be capable of being selectively mounted at least in one of the positioning member and the optical member.

5. The optical member unit according to claim 2, wherein the protrusion is made of a rubber material.

6. The optical member unit according to claim 3, wherein the positioning member is made of a synthetic resin and integrally formed with the protrusion.

7. The optical member unit according to claim 2, wherein the protrusion is placed only in the surface arranged in the vertically lower side in use state among the opposed surfaces between the optical member and the positioning member.

8. The optical member unit according to claim 2, wherein the protrusion is provided respectively in each adjacent surface in the circumferential direction among the opposed surfaces of the optical member and the positioning member.

9. The optical member unit according to claim 3, wherein the positioning member is composed of a receiving member for receiving the optical member on the backside and a holding member for holding the optical member from the front side, and wherein the protrusion is provided in the side of the receiving member.

10. The optical member unit according to claim 1, wherein the optical member is provided with the lens portion on a light-emitting surface, whereas, on an incident surface in the opposite side, provided with the reflecting layer having an opening corresponding to the focus position of the unit lenses.

11. A lighting device for display, comprising: the optical member unit according to claim 1, and a light source disposed in the backside of the optical member unit.

12. A display composed of the lighting device for display according to claim 11 and a display panel disposed in the front of the lighting device for display.

13. The display according to claim 12, wherein the display panel is a liquid crystal panel comprising a liquid crystal sealed in between a pair of substrates.

14. A television receiver comprising the display according to claim 12.

* * * * *